US009455576B2

(12) United States Patent
De Neve

(10) Patent No.: US 9,455,576 B2
(45) Date of Patent: Sep. 27, 2016

(54) SYSTEM FOR ELECTRICITY GRIDS FOR ADJUSTING OR MATCHING THE ELECTRICAL DEMAND

(71) Applicant: VITO NV (VLAAMSE INSTELLING VOOR TECHNOLOGISCH ONDERZOEK NV), Mol (BE)

(72) Inventor: Hans De Neve, Mol (BE)

(73) Assignee: VITO NV (VLAAMSE INSTELLING VOOR TECHNOLOGISCH ONDERZOEK NV), Mol (BE)

( * ) Notice: Subject to any disclaimer, the term of this patent is extended or adjusted under 35 U.S.C. 154(b) by 0 days.

(21) Appl. No.: 14/891,847

(22) PCT Filed: May 22, 2014

(86) PCT No.: PCT/BE2014/000023
§ 371 (c)(1),
(2) Date: Nov. 17, 2015

(87) PCT Pub. No.: WO2014/186846
PCT Pub. Date: Nov. 27, 2014

(65) Prior Publication Data
US 2016/0134122 A1    May 12, 2016

(30) Foreign Application Priority Data
May 22, 2013   (EP) .................................... 13168702

(51) Int. Cl.
*H02J 1/00*       (2006.01)
*H02J 3/14*       (2006.01)
*H02J 3/46*       (2006.01)

(52) U.S. Cl.
CPC .. *H02J 3/46* (2013.01); *H02J 3/14* (2013.01);
*Y02B 70/3225* (2013.01); *Y04S 20/222*
(2013.01); *Y10T 307/313* (2015.04); *Y10T 307/406* (2015.04)

(58) Field of Classification Search
CPC ......... H02J 3/14; H02J 3/46; Y10T 307/313; Y10T 307/406
USPC ...................................................... 307/19, 31
See application file for complete search history.

(56) References Cited

U.S. PATENT DOCUMENTS

2004/0039490 A1   2/2004  Kojima et al.
2011/0196546 A1   8/2011  Muller et al.
(Continued)

FOREIGN PATENT DOCUMENTS

EP        2159749 A1     3/2010
WO    2012-129675 A1    10/2012

OTHER PUBLICATIONS

International Search Report (ISR) dated Nov. 5, 2014, for PCT/BE2014/000023.
1st Written Opinion dated Nov. 5, 2014, for PCT/BE2014/000023.
European Search Report dated Nov. 5, 2013, for EP 13168702.2.
(Continued)

*Primary Examiner* — Carlos Amaya
(74) *Attorney, Agent, or Firm* — Bacon & Thomas, PLLC

(57) ABSTRACT

A smart grid management system and method where aggregators do not need to have knowledge about the topology of the electricity grid, the physical location of the end-points they control, or the congestion level of the grid. Instead, the smart grid system and method provides maximum freedom of operation to the aggregators to balance electricity supply and demand in such a way that the danger is reduced or it is even impossible for the aggregators to endanger voltage levels at the distribution system operator (DSO) level or the capacity levels at the transmission system operator (TSO) level. The distribution system operator is allowed to block, interrupt, or change the communication between aggregator and device based on a dual stage-gate control.

14 Claims, 12 Drawing Sheets

(56) References Cited

U.S. PATENT DOCUMENTS

| | | | |
|---|---|---|---|
| 2012/0065805 A1* | 3/2012 | Montalvo | G06Q 10/06 700/297 |
| 2013/0015713 A1 | 1/2013 | Hagihara | |
| 2013/0054036 A1 | 2/2013 | Cherian | |

OTHER PUBLICATIONS

International Preliminary Report on Patentability (IPRP) dated Sep. 2, 2015, for PCT/BE2014/000023.

2nd Written Opinion dated May 29, 2015, for PCT/BE2014/000023.

* cited by examiner

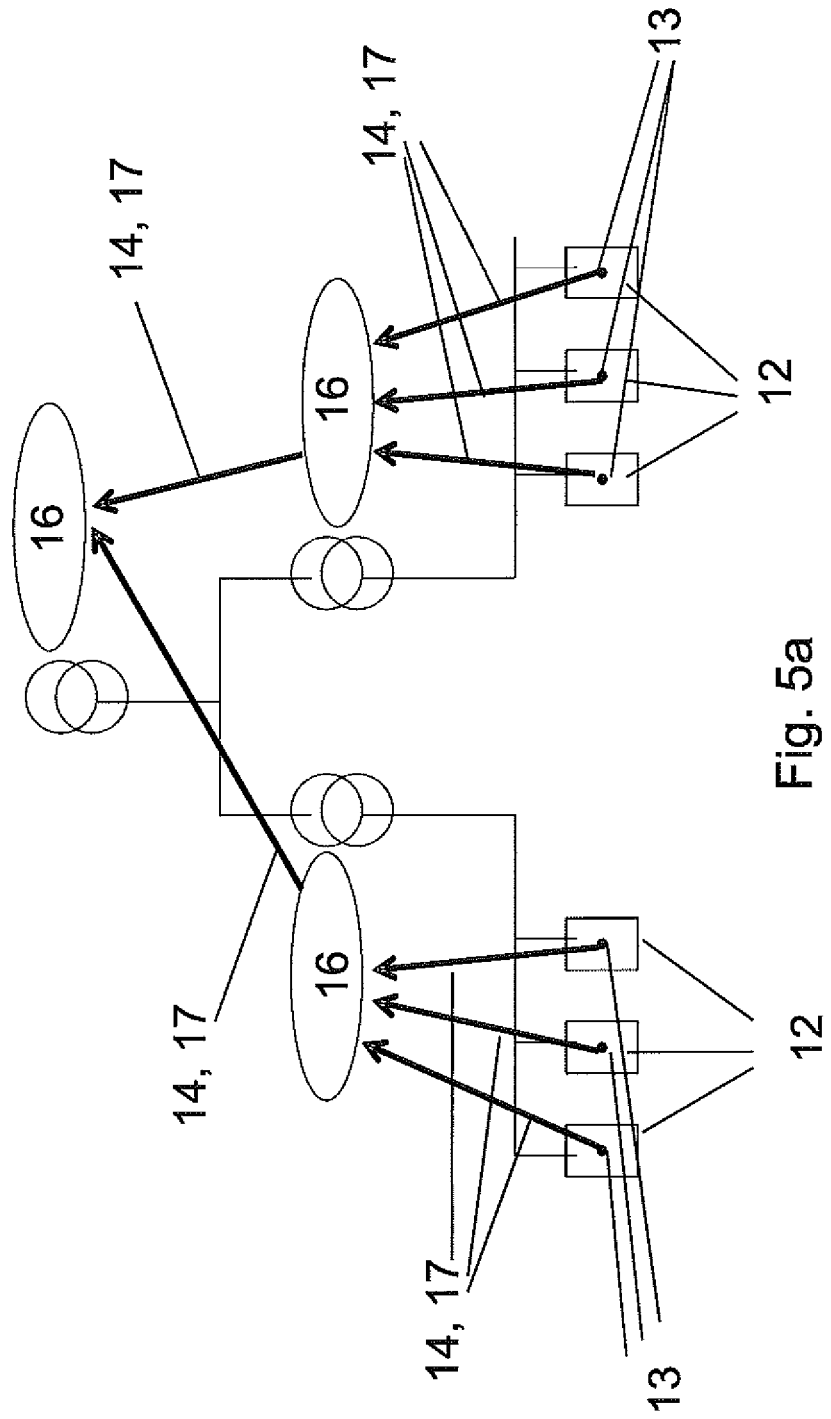

SYSTEM FOR ELECTRICITY GRIDS FOR ADJUSTING OR MATCHING THE ELECTRICAL DEMAND

The present invention relates to the field of energy management systems, and more specifically, to a system and method for adjusting or matching the electrical demand with the electrical production while taking into account the physical limitations of the interconnecting power transmission and distribution networks as well as components including software to implement such methods and systems.

BACKGROUND OF THE INVENTION

An electricity grid is an interconnected network for delivering electricity from suppliers to consumers. It consists of generating stations that produce electrical power, high-voltage transmission lines that carry power from distant sources to demand centers, and distribution lines that connect individual customers. The Smart Grid, regarded as the next generation power grid, uses two-way flows of electricity and information to create a widely distributed automated energy delivery network. The objective of a smart grid is to modernize the transmission and distribution of electricity to allow for facilitating greater competition between providers, enabling greater use of variable energy sources (distributed generation), establishing the automation and monitoring capabilities needed for bulk transmission at greater distances, and enabling the use of market forces to drive energy conservation. Some of the main variables that will define a smart grid system include optimizing electricity usage for on and off peak periods, creating greater integration with distributed generation resources, e.g., solar panel, wind power, advanced monitoring for supply and demand of electricity, increased metering of household appliances, and developing communication systems within grid operations that increase transparency and control.

Current and future electricity grids are facing a continuous increase of fluctuating renewable power resources such as wind turbines and photovoltaic generators on a central as well as on a decentralized level resulting in additional balancing effort. Accordingly information and communications technology needs to be developed for coordination in a smart electricity grid. In essence, stable power system operation comes down to keeping a dynamic balance between power supply (by generators) and power consumption (by loads) under the physical limitations of the interconnecting power transmission and distribution network.

Demand-side-managements systems, also known for example as the power matcher, are designed to keep a dynamic balance between power supply and power consumption. But such systems do not account for the physical limitations of the power transmission and distribution network.

Examples for such demand-side-systems can be found, for example, in US2013015713, US2004039490, and EP2159749.

In the past, extension of demand-side management systems have been proposed, which utilize grid constraints information to calculate balances that take physical limitations of the grid into account. But the electricity grid is a shared medium hosting many different aggregators and/or retailers of electricity and, thus, it is very difficult if not impossible to impose that every aggregator and/or retailer will correctly take grid constraints into account. Furthermore, questions of which grid constraints will be taken into account by which aggregator and/or retailer and how to arrange that every aggregator and/or retailer gets a fair share have to be solved. Moreover, solving these fundamental issues may involve very large sets of data being passed between the operators of the electrical grid and the aggregators and/or retailers of the electricity as the congestion level is local. Also, congestion of the grid would need to be indicated for every of the endpoints controlled by a particular aggregator and/or retailer and constantly updated as the congestion levels change.

While it is clear that demand-side-management systems can deal with grid constraints, it is not clear how this can work in an open market with multiple aggregators and/or retailers each using their own demand-side-management system and all acting on the same electricity grid.

The introduction of demand response leads to a changed load on the electricity grid, since activating flexibility involves the modification of the consumed or generated power, in reaction to control signals issued by the user of the flexibility, e.g. an aggregator, BRP, DSO or TSO. Uninformed use of demand response, without taking into account the potential conflict of interests of all stakeholders involved, may also lead to emergency situations. A grid in emergency is a grid in which it is impossible to transfer electricity without provoking system instability or causing damage, and should be avoided.

For example, a BRP may activate flexibility to maintain the balance within its portfolio, in the form of a request for demand increase. When all available sources of flexibility are located in one part of the distribution network, the simultaneous behaviour of the activated flexibility sources may lead to local violations of network constraints, causing congestion, deteriorated voltage quality, etc. In this case, demand response becomes a provoker rather than a solver of problems in the electricity system.

SUMMARY OF THE INVENTION

The present invention seeks to provide a system, method or components such as software for adjusting or matching electrical demand with electrical production while taking into account the physical limitations of the interconnecting power transmission and distribution networks.

A purpose of the present invention is to achieve a smart grid system, method or components such as software where aggregators and/or retailers of electricity do not need to have knowledge about the topology of the electricity grid, the physical location of the end-points they control, or the congestion level of the grid. Instead, the smart grid system, method or components such as software of the present invention provides freedom of operation to the aggregators and/or retailers to balance electricity supply and demand in such a way that the danger for the aggregators and/or retailers to endanger voltage levels at the distribution system operator (DSO) level or the capacity levels at the transmission system operator (TSO) level is reduced or eliminated.

It is an advantage of embodiments of the present invention that the aggregators and/or retailers have some or the freedom to balance electricity supply and demand while the grid operators, including distribution system operators (DSO) and transmission system operators (TSO), stay in control of the electricity grid. Preferably this is irrespective of how many aggregators and/or retailers there are, irrespective of the geographical scope of the aggregators and/or retailers and irrespective of how intelligent and responsible these aggregators and/or retailers are.

It is a further advantage of embodiments of the present invention that it leaves significant or even maximum freedom to existing and future demand-side-management systems in combination with existing and future congestion-management systems of DSO's and TSO's in such a way that the balance between production and demand can be maintained (e.g. within reasonable limits) while taking the grid constraints at the distribution system operator (DSO) level and/or the transmission system operator (TSO) level into account.

It is a still further advantage of embodiments of the present invention that the smart gridsystem, method or components such as software enables distribution system operators (DSO), transmission system operators (TSO), aggregators and/or retailers of electricity, and providers of electricity to interact and that without undue changes to existing standards and regulatory framework.

It is advantageous that embodiments of the present invention put the distribution system operator (DSO) in the loop of all communication between an aggregator and a device.

It is furthermore advantageous that in some embodiments the distribution system operator (DSO) is allowed to modulate e.g. block, interrupt, or change the communication between aggregator and device based on a dual stage-gate control.

It is a further advantage of embodiments of the present invention that the congestion-management system, method or components such as software used by the DSO is able to compile information about the device priority, meaning the urgency of a device to start consuming, and that the congestion-management system maintains a congestion index for each of its endpoints. The congestion-management system, method or components such as software enables to modulate such as block, interrupt, or change the communication between aggregator and device when the congestion index is higher than the device priority. The congestion-managements system, method or components such as software leaves the communication between aggregator and device undisturbed when the congestion index is lower than the device priority. The congestion index can be different for consumption than for production. It is further advantageous that that device priority and congestion index can be populated in the smart meter.

It is a further advantage of embodiments of the present invention that the DSO is able to block, interrupt or change the communication between aggregator and device in an intelligent way by making use of the device priority information such that in situations of overload the DSO is able to give priority to those devices that are most urgent to consume.

It is a further advantage of embodiments of the present invention that the DSO is not only able to change the communication between aggregator and device but can also pro-actively and independent from any communication between aggregator and device, control devices for the sake of network stability, based on the network congestion status and the device priority information.

It is a still further advantage of embodiments of the present invention that the congestion-management system, method or components such as software is able to insert a "congestion tag" into the communication between aggregator and device and that the aggregator is able to use this "congestion tag" as a level of probability that its commands to that end-point could be interrupted by the DSO.

Another advantage of embodiments of the present invention is that the congestion-management system, method or components such as software maintains a "Network Access Point tag" for each Network access point, that the system, method or components such as software is able to insert this "Network Access Point tag" into the communication between aggregator and device, and that the aggregator is able to use this "Network Access Point tag" in his communication with the TSO system. It is further advantageous that the "Network Access Point tag" allows the aggregator to inform the TSO where the aggregator will insert or retrieve electricity on the TSO grid.

At least one, some or all of the above objectives is/are accomplished by providing a smart grid system, method or components such as software according to the present invention that relate to the exchange of information between a device, the DSO, the aggregator and/or retailer and the TSO. Particular and preferred aspects of the invention are set out in the accompanying independent and dependent claims. Features from the dependent claims may be combined with features of the independent claims and with features of other dependent claims as appropriate and not merely as explicitly set out in the claims.

According to the advantageous embodiments of the present invention, a method for adjusting or balancing electricity demand with electricity production while taking into account the physical limitations of the distribution and transmission networks comprises the steps of:

providing a congestion-management system for an interconnecting power distribution network (e.g. grid matcher system) that enables a distribution grid operator to stay in control of the distribution grid;

placing the congestion-management system (e.g. grid matcher system) into the communication between a demand-side management system (e.g. power matcher system) used by an aggregator and a device via a standardized device control interface; and enabling the distribution grid operator to intercept the communication between the demand-side management system (e.g. power matcher system) and the device at an interception point located on the standardized device control interface by utilizing the congestion-management system (e.g. grid matcher system).

According to preferred embodiments of the present invention, the method further comprises the steps of:

providing a congestion-management system agent (e.g. grid matcher agent) within the congestion-management system (e.g. grid matcher system); and compiling information about the priority of the device by calculating a congestion-management system device priority value (e.g. grid matcher device priority value) with the congestion-management system agent (e.g. grid matcher agent).

According to preferred embodiments of the present invention, the method further comprises the step of:

compiling and maintaining a congestion index that gives an indication of the grid congestion at any given moment in time and for the location of any particular congestion-management system agent (e.g. grid matcher agent).

According to preferred embodiments of the present invention, the method further comprises the steps of:

providing a smart meter within the congestion-management system (e.g. grid matcher system); and applying the concept of local droop control to determine the value of the congestion index based on the voltage at the smart meter.

The local droop control is only one example of how to calculate the congestion index, the present invention includes any suitable way of calculating a congestion index.

According to preferred embodiments of the present invention, the method further comprises another example of calculation the congestion index, the steps comprising:
- providing a congestion management (grid matcher) prioritizer within the congestion-management system (e.g. grid matcher system);
- providing the congestion management (grid matcher) prioritizer with the congestion-management system device priority value (e.g. grid matcher device priority value) and grid parameter information; and
- calculating the congestion index with the congestion management (grid matcher) prioritizer.

Both the local droop control and the congestion management (grid matcher) prioritizer need not operate at the same time. In general only one of such need be used. The present invention is not limited to these two ways to calculate the congestion index. The skilled person will appreciate that on understanding the disclosure above other methods of calculating a congestion index are included within the scope of the present invention.

According to preferred embodiments of the present invention, the method further comprises the step of:
- populating the congestion management (grid matcher) device priority value and the congestion index in the smart meter.

According to preferred embodiments of the present invention, the method further comprises the step of:
- leaving the communication between aggregator and device undisturbed when the congestion index is lower than the congestion management (grid matcher) device priority value.

According to preferred embodiments of the present invention, the method further comprises the step of:
- blocking, interrupting, or changing the communication between the aggregator and device when the congestion index is higher than the congestion management (grid matcher) device priority value.

According to preferred embodiments of the present invention, the method further comprises the step of:
- inserting a congestion tag into the communication between the aggregator and device thereby enabling the aggregator to use the congestion tag as a level of probability that a command to the device initiated by the aggregator could be interrupted by the grid operator.

According to preferred embodiments of the present invention, the method further comprises the steps of:
- maintaining a network access point tag for each network access point;
- inserting the network access point tag into the communication between the aggregator and the device; and
- using the network access point tag for the communication between the aggregator and the transmission system operator.

According to preferred embodiments of the present invention, the method further comprises the step of:
- using the network access point tag to inform the transmission system operator where the aggregator will insert or retrieve electricity on the transmission system operator grid.

According to preferred embodiments of the present invention, a smart grid system for adjusting or balancing electricity supply and demand while taking into account the physical limitations of the interconnecting power transmission and distribution networks comprises a demand-side-management system (e.g. power matcher system), a congestion management system of the DSO (e.g. grid matcher system), a congestion management system of the TSO, a congestion management (grid matcher) agent, and a smart meter for performing the above listed method steps.

Embodiments of the present invention provide a system for matching electricity demand with electricity production while taking the physical limitations of the electricity grid into account, comprising:
- Means for providing a grid matcher system (10) that enables a electricity grid operator (11) to stay in control of the electricity grid (50);
- Means for placing the congestion management (grid matcher) system (10) into communication between a demand-side-management system (e.g. power matcher system) (20) used by an aggregator (21) and a device (40) via a standardized device control interface (30); and
- Means for enabling the electricity grid operator (11) to intercept the communication between the demand-side-management system (e.g. power matcher system) (20) and the device (40) at an interception point (32) located on the standardized device control interface (30) by utilizing the congestion management (grid matcher) system (10).

According to preferred embodiments of the present invention a computer program in a computer readable format comprises the software components for performing the above listed method steps.

BRIEF DESCRIPTION OF THE DRAWINGS

The above and other characteristics, features, and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

FIG. 5*a* is a schematic block diagram illustrating the network-based calculation of the congestion index (going up) in accordance with an embodiment of the present invention;

Figure 1:
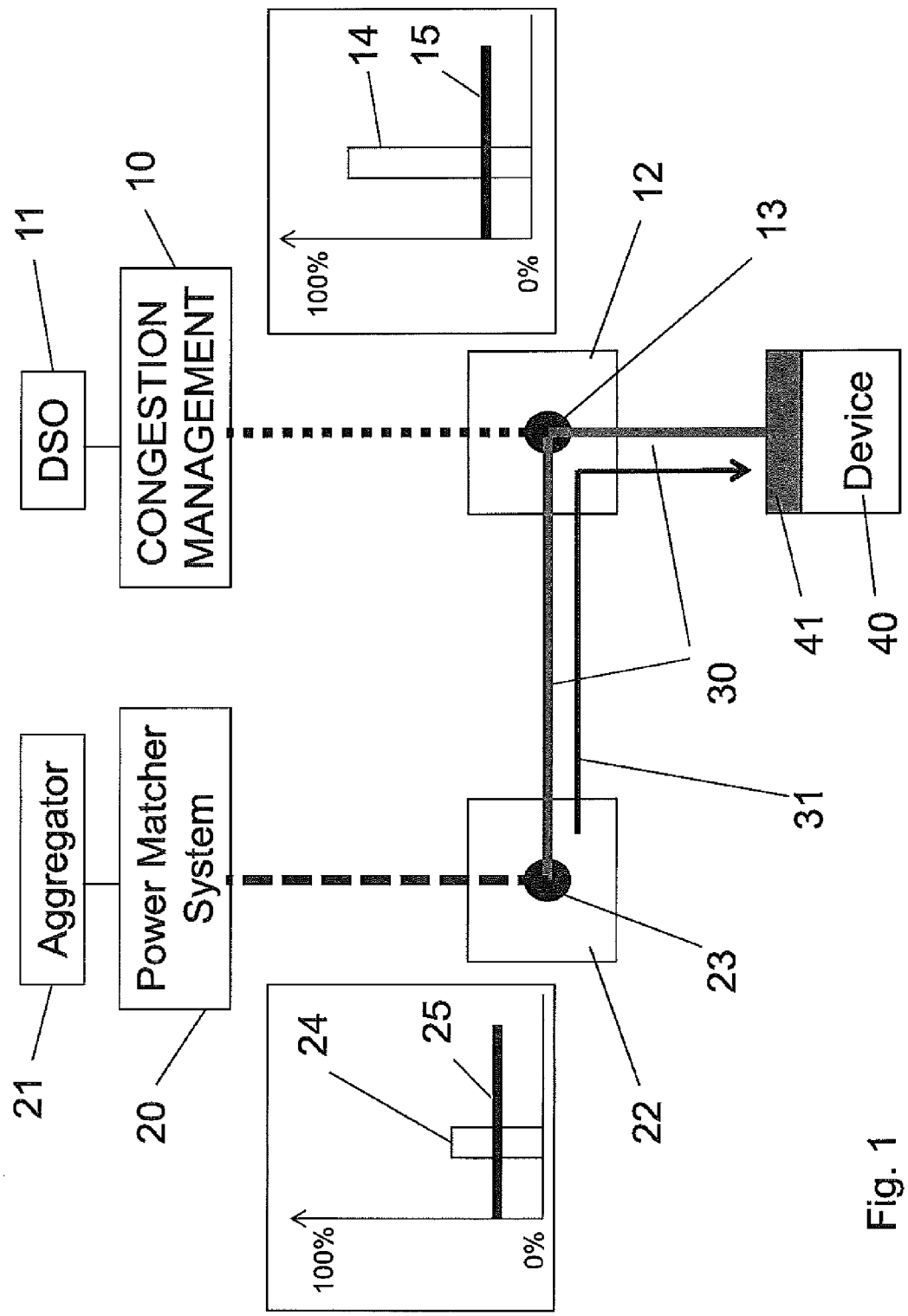
FIG. 1 is a schematic block diagram of a smart grid architecture in accordance with an embodiment of the present invention.

In the different figures, the same reference signs refer to the same or analogous elements.

DETAILED DESCRIPTION OF THE INVENTION

The present invention will be described with respect to particular embodiments and with reference to certain drawings but the invention is not limited thereto but only by the claims. Any reference signs in the claims shall not be construed as limiting the scope. The drawings described are only schematic and are non-limiting. In the drawings, the size of some of the elements may be exaggerated and not drawn on scale for illustrative purposes.

Where the term "comprising" is used in the present description and claims, it does not exclude other elements or steps. Where an indefinite or definite article is used when referring to a singular noun e.g. "a" or "an", "the", this includes a plural of that noun unless something else is specifically stated. Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method.

In the description provided herein, numerous specific details are set forth. However, it is understood that embodiments of the invention may be practiced without these specific details. In other instances, well-known methods, structures, and techniques have not been shown in detail in order not to obscure an understanding of this description.

The following terms or definitions are provided solely to aid in the understanding of the invention. As employed herein, the term "distribution system operator (DSO)" refers to a natural or legal person responsible for operating, ensuring the maintenance of and, if necessary, developing the electricity distribution system in a given area and, where applicable, its interconnections with other systems and for ensuring the long term ability of the system to meet reasonable demands for the distribution of electricity.

As employed herein, the term "transmission system operator (TSO)" refers to a natural or legal person responsible for operating, ensuring the maintenance of and, if necessary, developing the electricity transmission system in a given area and, where applicable, its interconnections with other systems, and for ensuring the long-term ability of the system to meet reasonable demands for the transmission of electricity.

As employed herein, the term "device" refers to an individual piece of equipment, such as, for example, a thermostat, or a washing machine, or a building management system, such as domotics for houses or energy management system for office buildings) or an industrial control process that controls entire industrial sites.

As employed herein, the term "power matcher" refers to a suitable demand side management system. Any aggregator can have its own and proprietary demand-side-management system. Demand-side management is the modification of consumer demand for energy through various methods such as financial incentives and education. Usually, the goal of demand side management is to encourage the consumer to use less energy during peak hours, or to move the time of energy use to off-peak times such as nighttime and weekends.

As employed herein, the term "grid matcher" refers to any suitable congestion-management system for an interconnecting power distribution network, such as a power grid. Congestion represents the situation when technical constraints (e.g., line current, thermal stability, voltage stability, etc.) or economic restrictions (e.g., priority feed-in, contract enforcement, etc.) are violated and thus restrict power transmission and distribution. Congestion management is aimed at obtaining a cost optimal power dispatch while accounting for those constraints. GridMatcher™ is a trade name of Vlaams Instituut voor Technologisch Onderzoek, naamloze vennootschap, abbreviated Vito NV.

As employed herein, the term "aggregator" refers to someone who joins two or more customers into a single purchasing unit to negotiate the purchase of electricity from retail electric providers (REPs). Aggregators typically compare offers and contract terms and negotiate electric rates with REPs. Aggregation is a means of combining the loads (power requirements) of more than one electricity account with the goal of shopping the electricity supply market to get a better price for power. The idea is that all members of an aggregation pool would benefit from lower prices made possible by a large economy of scale.

As employed herein, the terms "grid", "network", "power grid", "electricity grid" can be used interchangeably. The term "price index" refers to a control variable not to an item of billing. The "price" of electrical power can be used to control consumption or production. The price index is not the same as the price at which electricity is sold or bought. A high price index will have the effect of reducing consumption wherever that is possible to justified. A low price index will encourage consumption. So "price" is a steering variable.

In case the activation of flexibility results in local grid problems, the system operators should have the option to intervene in demand response signals to prevent emergency situations and ensure security of supply and quality of service.

On the other hand, the demand response control system should be informed of the situation of the grid, so it can proactively avoid grid constrained situations, and thus avoid that the delivery of the requested flexibility is hindered.

A congestion-management system for an interconnecting power distribution network (e.g. grid matcher system) that enables a distribution grid operator to stay in control of the distribution grid is a solution for a local emergency prevention mechanism, that allows system operators to protect their grids in which demand response is deployed.

A congestion management system according to embodiments of the present invention is based a 'lawful interception' mechanism. A congestion management system according to embodiments of the present invention implements a local interface to both the devices and appliances on the network which are sources of flexibility and the aggregators, that allows the system operators to intervene in the demand response control if grid constraints threaten to be violated. Consuming, as well as producing and storage units can be sources of flexibility. In return, a congestion management system according to embodiments of the present invention allows actions and warnings to be communicated to the aggregators. The congestion management system according to embodiments of the present invention provides an interface that allows monitoring of both aggregator signals and the flexibility of flexibility sources. The interface is placed preferably where the flexibility source communicates with the aggregator, and where local grid information is at hand. In most of the cases the most practical place is where the source of flexibility is connected to the electricity grid. A congestion management system according to embodiments of the present invention can be managed by the system operator responsible for the electricity grid in question.

The deployment and functionality of a congestion management system according to embodiments of the present invention is based on the assumption that good, and generally acknowledged device abstraction interfaces for flexibility sources are provided. Equipping sources of flexibility with generic device abstraction interfaces can have one or more of the following advantages:

The generic device abstraction interfaces contain functionality to query information on the available flexibility of the device, as well as functionality to activate available flexibility (=monitoring and control).

The ability to control different types of flexibility sources can be achieved by the aggregators complying with the generic device abstraction interfaces.

The generic device abstraction interfaces support consuming, as well as producing and storage units as sources of flexibility.

The generic device abstraction interfaces may be present on a single source of flexibility or on a specified cluster of flexibility sources. For example, all flexible devices within one household may be interfaced as one cluster through an energy management gateway.

There are different options for a congestion management system according to embodiments of the present invention on how to handle the information stream from and to the aggregators and flexibility sources.

The congestion management system according to embodiments of the present invention informs the aggregator of the current grid situation, using different warning levels. Multiple warning levels can be composed: for consumed power as well as generated power, active and reactive power.

Level 1
Given the current loading of the grid, all sources of flexibility can be activated, in any way.

Level 2:
The activation of sources of flexibility is possible, but depends on the combination of sources that is activated, on the power level, on the power direction (generated, consumed, active or reactive), etc.

Level 3:
If a source of flexibility is activated for the given power direction (generated, consumed, active or reactive), it will be blocked.

A congestion management system according to embodiments of the present invention can adapt aggregator control signals, e.g. only when needed and can always transparently pass on flexibility information without adapting. This ensures that a congestion management system according to embodiments of the present invention operates as transparently as possible and keeps the flexibility as much as possible available to the market, while offering sufficient means to the system operators to safeguard their grids.

An advantage of a congestion management system according to embodiments of the present invention is to avoid emergency situations, i.e. when uninformed use of demand response by aggregators threatens to cause grid constraint violations. A congestion management system according to embodiments of the present invention can be used with a tool for system operators enabling them to continuously use their grids more efficiently by activating flexibility available in their grids. System operators may have access to a flexibility market (in any form), where flexibility can be bought to make more efficiently use of their grid, e.g. to optimize the load factor of the grid. A congestion management system according to embodiments of the present invention can collect actual grid data, for instance based on, but not limited to, local measurements. This grid data can be combined by a congestion management system according to embodiments of the present invention with aggregator and flexibility source data from the generic device abstraction interfaces and enables the identification of potential grid constraint violations.

There are no requirements on how the grid measurements, and the grid constraint violations calculation should happen. This calculation may depend on local needs and specifications. This way, vendor or technology lock-in for the system operators is prevented.

When grid constraints are threatened to be violated by a certain flexibility request, a congestion management system according to embodiments of the present invention can intercept this request, and change it to avoid grid failure or breakdown.

As long as the electricity grid is able to support the requested flexibility activation, there is no need for a congestion management system according to embodiments of the present invention to intervene.

A congestion management system according to embodiments of the present invention can inform the aggregator of the current grid situation, e.g. using different warning levels. For example, these levels could be:

when no problems are expected,
when problems are more likely to occur, and
when the grid is close to an emergency situation.

Multiple warning levels can be composed for consumed power as well as generated power, both active and reactive power.

Preferably, a congestion management system according to embodiments of the present invention informs an aggregator of actions that were performed, e.g. action information is communicated to the aggregator.

Knowledge on the network access point of the sources of flexibility increases the traceability of flexibility to geographical location and BRP perimeter. Increased traceability can be an advantage for settlement and remuneration within a demand response context. Also, if aggregators are provided with network access point information, they are enabled to offer flexibility within a flexibility market for situations where localisation information is of primary importance, e.g. for system operators.

A congestion management system according to embodiments of the present invention is able to tag the signals from the sources of flexibility with a tag containing information on the network access point.

A congestion management system according to embodiments of the present invention can support both active as well as reactive power sources/consumers of flexibility.

Even if not all flexibility sources are equipped with a congestion management system according to embodiments of the present invention, the overall system can still operate if the congestion management system according to embodiments of the present invention is only installed in a part of the grid. This allows the gradual introduction and rollout of a congestion management system according to embodiments of the present invention.

All actions, changed or unaltered, and grid information should preferably be logged to be available afterwards for post processing (e.g. remuneration, etc.).

Figure 2:
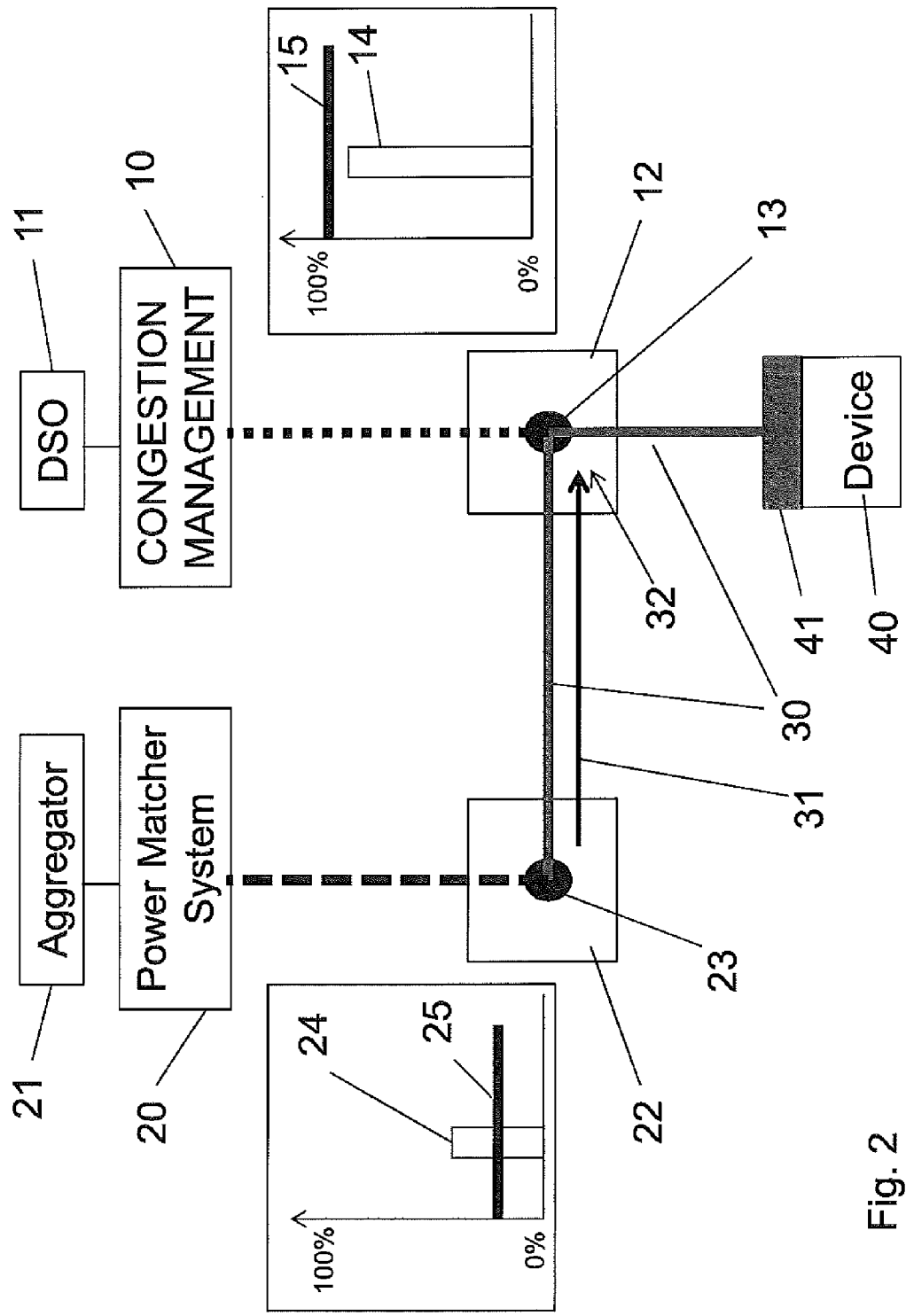
FIG. 2 is a schematic block diagram of an intercepted standardized device control interface in accordance with an embodiment of the present invention.
Figure 3A:
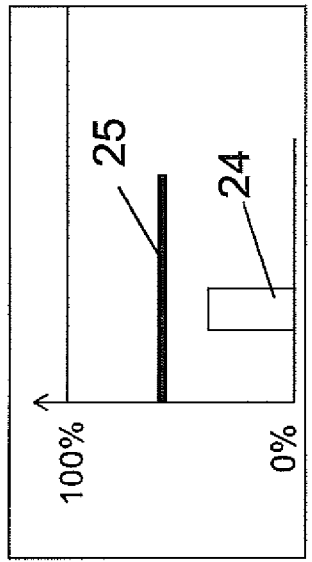
FIG. 3*a* is a diagram schematically illustrating the relation between device priority and an index in accordance with an embodiment of the present invention.
Figure 3B:
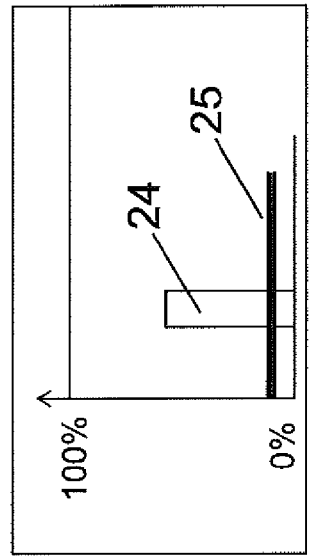
FIG. 3*b* is a diagram schematically illustrating the relation between device priority and an index in accordance with an embodiment of the present invention.
Figure 3C:
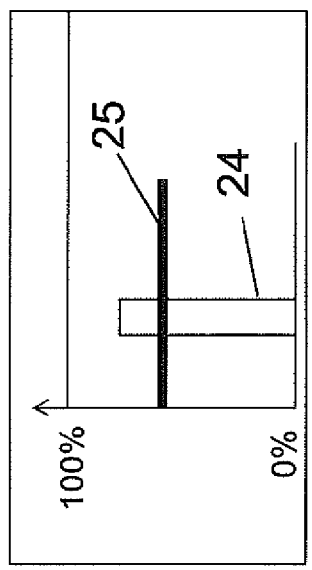
FIG. 3*c* is a diagram schematically illustrating the relation between device priority and an index in accordance with an embodiment of the present invention.
Figure 3D:
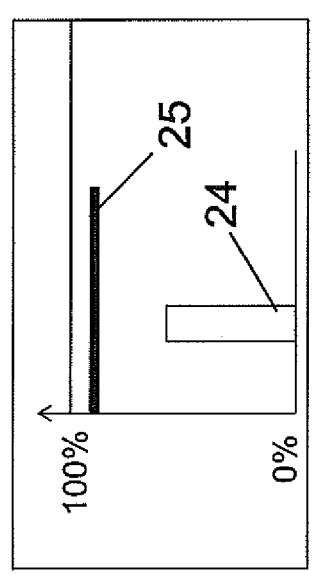
FIG. 3*d* is a diagram schematically illustrating the relation between device priority and an index in accordance with an embodiment of the present invention.

Referring to FIGS. 1 and 2, smart grid architecture is illustrated in accordance with embodiments of the present invention. The smart grid architecture comprises a combination of a congestion management (grid matcher) system 10 or a congestion-management system in accordance with embodiments of the present invention and any known power matcher system 20 or a typical prior art demand-side-management system. The congestion management (grid matcher) system 10 can be used by a distribution system operator (DSO) 11. The congestion management (grid matcher) system 10 comprises a smart meter 12 and a plurality of congestion management (grid matcher) agents 13, of which one is illustrated. The mapping of functions on the smart meter 12 is merely an example for illustration purposes, other mappings are possible.

The prior art demand-side-management system (e.g. power matcher system) 20 can be used by an aggregator and/or retailer of electricity 21. Where in the following it is referred to an aggregator 21, it is to be interpreted as aggregator and/or retailer of electricity 21. The demand-side-management system (e.g. power matcher system) 20 comprises an energy gateway 22 and a plurality of demand-side-management agents (e.g. power matcher agents) 23, of which one is illustrated. The demand-side-management system (e.g. power matcher system) 20 compiles various parameters, such as a demand-side-management (e.g. power matcher) device priority value 24 and a price index 25. The mapping of functions on the energy gateway 22 is merely an example for illustration purposes, other mappings are possible.

A standardized device control interface 30 connects the energy gateway 22 over the smart meter 12 with a device 40 and enables communication between them. The device 40 comprises device control software 41. The standardized device control interface 30 carries a signal 31 for delivering power to device 40 initiated by the aggregator 21 from the energy gateway 22 to the device 40 via the smart meter 12. In practice, there will be a plurality of devices 40, each matched with a congestion management (grid matcher) agent 13 and a demand-side-management (e.g. power matcher) agent 23.

The purpose of the congestion-management system and, thus, of the congestion management (grid matcher) system 10, in accordance with embodiments of the present invention is to enable interception of the communication between the energy gateway 22 to the device 40 by the distribution system operator (DSO) II, and specifically between the demand-side-management (e.g. power matcher) agent 23 and the device control software 41. The interception point 32 is located on the standardized device control interface 30. This avoids that interception can takes place on a proprietary interface, for example of the demand-side-management system (e.g. power matcher) 20. The interception point should be as close as possible to the device 40 to allow the system to scale. Based on a dual-stage-gate approach as will be described below, the congestion-management system 10 enables the distribution system operator (DSO) II to prevent that any electricity production and/or consumption is invoked that would surpass the capabilities of the DSO network 50 (as shown in FIG. 2)

Each congestion management (grid matcher) agent 13 is able to compile a priority level 14 for the device 40. This congestion management (grid matcher) device priority value 14 is not required to be the same as the demand-side-management (e.g. power matcher) device priority value 24 compiled by the demand-side-management (e.g. power matcher) agent 23. The priority value 14 within the smart meter 12 is proprietary to the congestion-management system (grid matcher system) 10 while the priority value 24 within the energy gateway 22 is proprietary to the demand-side-management system (e.g. power matcher system) 20.

In both cases the priority value 14 or 24 is an indication of the "urgency to consume" or "urgency to produce" in case of production.

When the device priority 24 is higher than the price index 25 as illustrated in FIG. 3.a, the demand-side-management (e.g. Power Matcher) agent 23 will send a command to device 40 to start consuming. When the device priority 24 is lower than the price index 25 as illustrated in FIG. 3b, the demand-side-management (e.g. Power Matcher) agent 23 will send a command to the device 40 to stop consuming. When the price index 25 is relatively low as shown in FIG. 3d, this represents an incentive for most of the devices 40 to consume. When the price index 25 is relatively high as shown in FIG. 3c, this represents an incentive for most of the devices 40 not to start consuming. A device 40 with priority value=0% means that the device 40 does not want to consume, no matter how high the incentive to start consuming. A device with priority value=100% means that the device 40 will start consuming, no matter how high the incentive not to start consuming. The same mechanism can be applied to electricity production.

The priority value (14 or 24) of a device 40 can be calculated based on the status of the device 40. The formula below is an example how one can calculate the priority of a heat pump with two buffer vessels, one vessel for space heating and another vessel for sanitary hot water. The device is characterized by following parameters:

$SOC_{hhw}$ is the state of charge of the vessel for space heating.

$SOC_{dhw}$ is the state of charge of the vessel for sanitary warm water

The state of charge is a value between 0% and 100%. It reflects the temperature of the vessel and the amount of water. These are typical parameters known by the device. A fully charged vessel has a state of charge=100%. A vessel that is completely empty has a state of charge=0%.

$weight_{dhw}$ is the weight factor for the buffer vessel of the sanitary warm water. It is an additional parameter one can use to give a higher importance to either sanitary warm water or spacing heating With these parameters the priority of the system composed of a heat pump with two buffer vessels can be expressed as:

$$priority = \frac{weight_{DHW} \cdot prio_{DHW} \cdot (1 - prio_{HHW}) + (1 - weight_{DHW}) \cdot prio_{HHW} \cdot (1 - prio_{DHW})}{weight_{DHW} \cdot (1 - prio_{HHW}) + (1 - weight_{DHW}) \cdot (1 - prio_{DHW})}$$

whereby $Prio_{hhw} = 1 - SoC_{hhw}$, and $Prio_{dhw} = 1 - SoC_{dhw}$

This is merely an example. The absolute value of the priority 14 or 24 should be aligned with the absolute values of the congestion index 15 or 25 that is being used by either the congestion management (grid matcher) system or the demand-side-management system (e.g. power matcher system).

Besides the congestion management (grid matcher) device priority value 14, the congestion management (grid matcher) system 10 is provided with the information about a congestion index 15. Each congestion management (grid matcher) agent 13 is able to compile and maintain a congestion index 15 for each endpoint of the network. The congestion index 15 is an indication of the network congestion at any given moment in time. The congestion index is a local value, reflecting the local network congestion. The congestion index could be different for consumption and for production: sometimes the network is not able to afford extra consumption but it could afford extra production. There are several means to calculate the congestion index 15.

Figure 4:
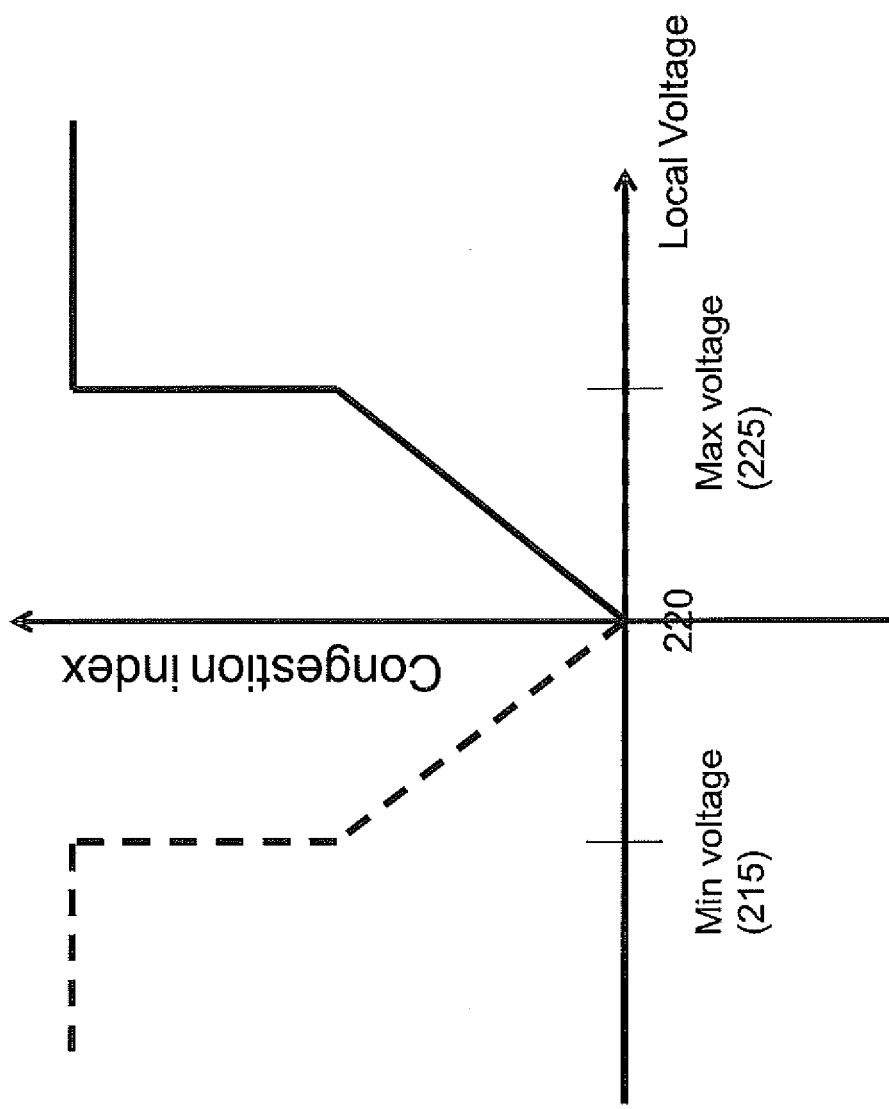
FIG. 4 is a diagram schematically illustrating the calculation of a congestion index via local droop control in accordance with an embodiment of the present invention.

For example, a simple way to calculate the congestion index 15 is based on the local voltage deviation like in the concept of local droop control, as schematically illustrated in FIG. 4. In the case of local droop control the smart meter 12 will determine the value of the congestion index 15 based on the value of the voltage at the smart meter 12 itself. There will be a value for the congestion index on consumption (dashed line) and a value for the congestion index on production (solid line). If the voltage is lower than normal one should discourage consumption, therefore the value of the congestion index 15 for consumption will increase as the voltage gets lower. When the voltage Teaches a minimum boundary value the value of the congestion index will become very high such that all additional requests for consumption will be overruled.

If the voltage is higher than normal one should discourage additional production, therefore the value of the congestion index 15 for production will increase as the voltage gets higher. When the voltage reaches a maximum boundary value the value of the congestion index will become very high such that all additional requests for production will be overruled.

Figure 5B:
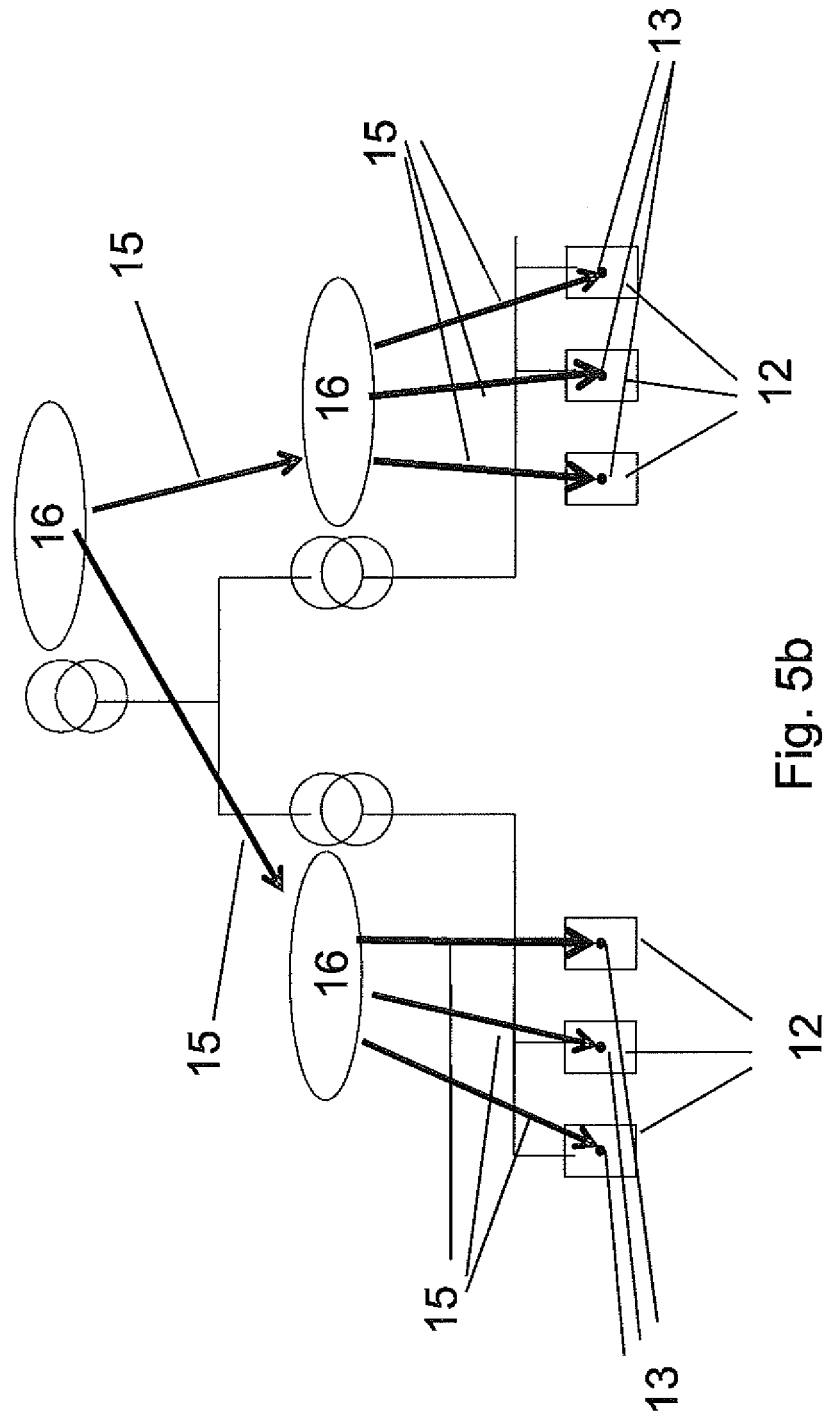
FIG. 5*b* is a schematic block diagram illustrating the network-based calculation of the congestion index (going down) in accordance with an embodiment of the present invention.

Alternatively the congestion index 15 could be based on a calculation done in the network, as schematically illustrated in FIGS. 5a and 5b. In this more advanced scheme a calculation of the congestion index 15 is based on the priority values 14 of the various connected devices 40 as well as the current and expected congestion level of the network 17.

In that case, as shown in FIG. 5a, each smart meter 12 will forward the device priority information 14 as well as any network parameter information 17 to a network server, a congestion management (grid matcher) prioritizer 16. There could be a hierarchy of such network servers 16 to keep the solution scaleable. The congestion management (grid matcher) prioritizers 16 will calculate an appropriate congestion index 15 for every of the end-points such that—given the values of the device priorities 14—the congestion index 15 is high enough to prevent overall congestion in the network.

The congestion management (grid matcher) prioritizer 16 will send back this congestion index 15 to every of the smart meters 12 and, thus, to each of the congestion management (grid matcher) agents 13, as illustrated in FIG. 5b. Each congestion management (grid matcher) agent 13 will receive a different congestion index 15. The congestion index 15 is being updated whenever relevant changes happen or are expected to happen on the network, for example, based on actual load on the network as well as the typical knowledge base like requests to consume or produce, weather forecasts, historical data on consumption/production, etc.

Irrespective of how the congestion index 15 is calculated, the combination of congestion management (grid matcher) device priority value 14 and congestion index 15 allows the DSO 11 to overrule the instructions from the aggregator 21 in case of congestion and allows the DSO 11 to do this in an intelligent way: in case of congestion, priority should still be given to those devices 40 that are most urgent to charge.

The congestion management (grid matcher) device priority value 14 and the congestion index 15 are used as follows to achieve this:

when the congestion management (grid matcher) device priority value 14 is higher than the congestion index 15, the signal 31 that comes from the aggregator 21 is not disturbed when the congestion management (grid matcher) device priority value 14 is lower than the congestion index 15, the signal 31 that comes from the aggregator 21 will be interrupted by the DSO 11. So in case the congestion is low, the sequence will look like as illustrated in FIG. 1.

When the network becomes congested, the congestion index 15 will raise, as illustrated in FIG. 2. When the congestion index 15 becomes higher than the congestion management (grid matcher) priority value 14 of the device 40, the congestion management (grid matcher) system 10 will overrule the signal from the demand-side-management (e.g. power matcher) agent 23 and transform, for example block a command to start the device 40. The congestion management (grid matcher) system 10 will further respond to the demand-side-management (e.g. power matcher) agent 23 that the device 40 did not start.

Figure 6:
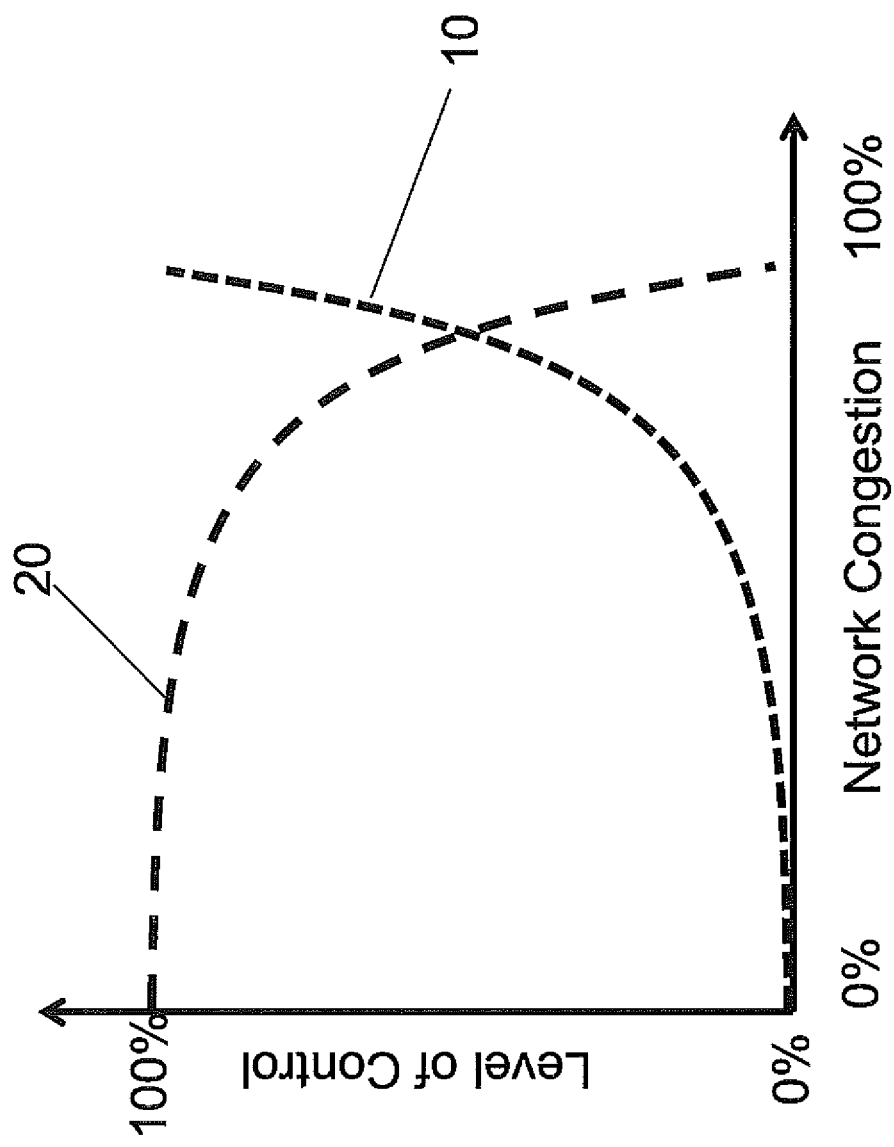
FIG. 6 is a diagram illustrating the gradual transition between the level of control by the aggregator and the level of control by the distribution system operator (DSO), in accordance with an embodiment of the present invention.

Now referring to FIG. 6, the gradual transition between the level of control by the aggregator 21 and the level of control by the distribution system operator (DSO) 11 is illustrated in accordance with embodiments of the present invention.

When congestion is moderate not too many overrule decisions will be taken but as congestion increases more and more decisions will be overruled and in this way the congestion management (grid matcher) system 10 gradually takes over from the demand-side-management system (e.g. power matcher system) 20.

Such architecture allows the market and the aggregators 21 to play their full role as long as the network is able to support it. But as soon as the network comes into troubles the network operators 11 will take over. This happens in a gradual way, as shown in FIG. 6.

In addition, the smart meter 12 can do more than simply overrule commands of the aggregator 21. The smart meter 12 could also take the initiative to start or stop certain devices 40 if the congestion index 15 would become too high. So, the congestion-management system 10 in accordance with embodiments of the present invention prevents that aggregators 21 bring the DSO network 50 down and allows DSO's 11 to take action themselves to keep the DSO network 50 stable.

Figure 7:
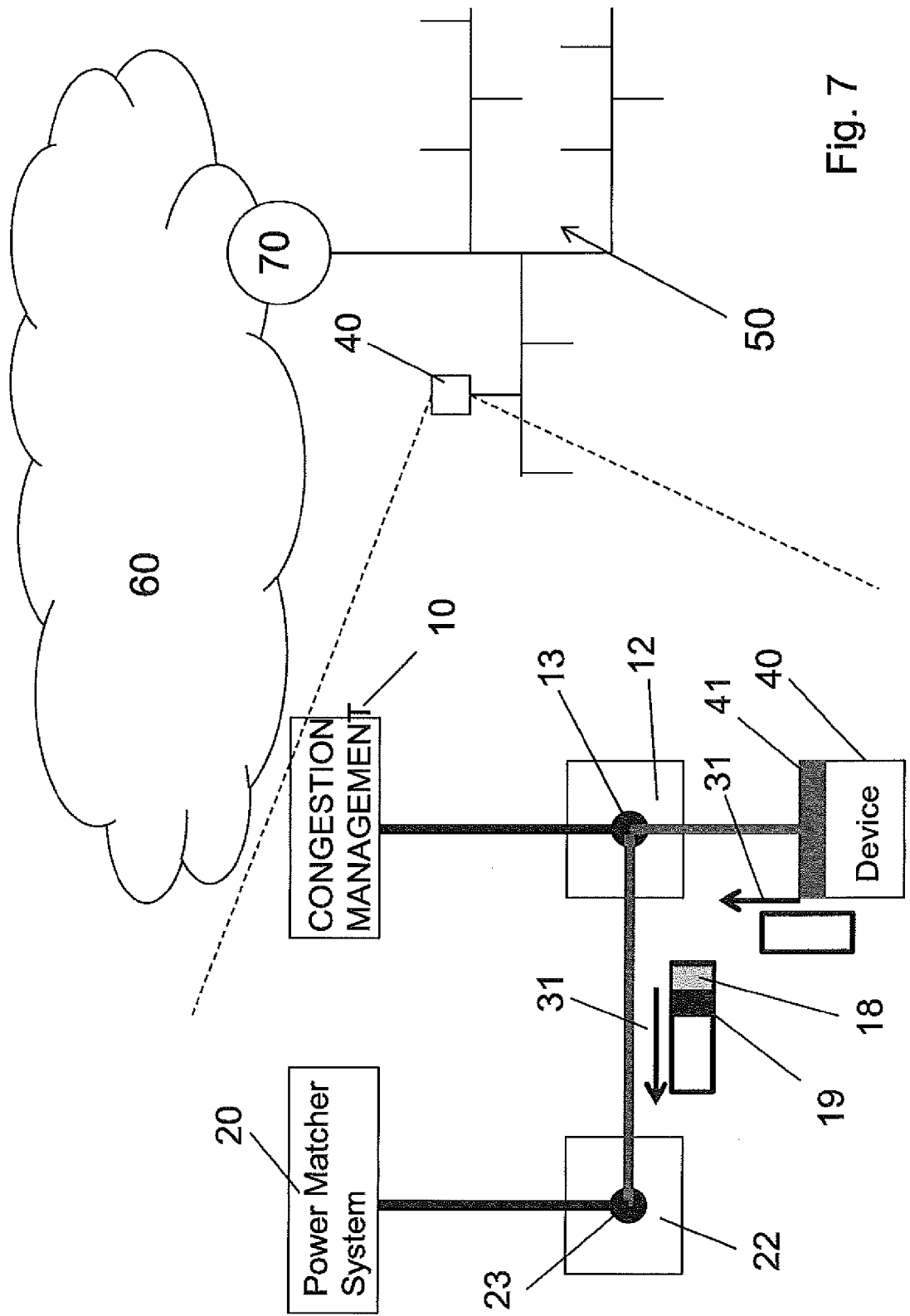
FIG. 7 is a schematic block diagram illustrating a demand-side-management system and a congestion-management system in correlation with an interconnecting transmission system operator (TSO) network and distribution system operator (DSO) network.

Now referring to FIG. 7, a demand-side-management system 20 and a congestion-management system 10 in correlation with an interconnecting transmission system operator (TSO) network 60 and distribution system operator (DSO) network 50 is illustrated in accordance with embodiments of the present invention. The congestion management system 10 is for the DSO.

In order to avoid that the aggregator 21 is "taken by surprise" when the grid operator 11 overrules a number of the aggregator decisions, the congestion management (grid matcher) agent 13 "tags" the information sent to the demand-side-management (e.g. power matcher) agent 23 with a congestion tag 18. In this way the aggregator 21 will learn about the local network congestion issue. This is an additional piece of information that an aggregator 21 can take into account when deciding to switch on a device 40 or not. This is useful because it is in the interest of the aggregator 21 to avoid as many overrules as possible to keep a predictable response of the devices 40 he controls. So an intelligent aggregator 21 will try to avoid switching on devices 40 that are in congested areas. Accordingly, the congestion tag 18 can be interpreted by the aggregator 21 as a probability that its command to consume or produce can be overruled. The aggregator 21 can take this additionally provided information into account to make more reliable predictions about the flexibility that he will be able to invoke effectively.

The congestion tag 18 is not necessarily the same as the congestion index 15. The congestion index 15 is proprietary to the congestion-management system 10 used by the DSO 11. The congestion tag 18 is a standard piece of information about the local network congestion that any aggregator 21 should be able to interpret in the same way.

Such a tagging method is much more robust and scalable than passing on information between DSO 11 and aggregator 21 using currently available prior art centralized systems. An additional advantage is that the aggregator 21 does not need to know anything about the topology of the network 50 or the physical location of devices 40. The aggregator 21 sees requests from devices 40 that are tagged with a congestion tag 18 that the aggregator 21 can interpret as a probability that a command 31 to this device 40 could be interrupted by the grid operator 11. This method is very scalable and part of the standardized interface 30 that any demand-side-management system will need to support.

The aggregator 21 is free to make use of that information or not. This solution has been designed such that it does not rely on the intelligence or good governance of the aggregators 21 to avoid network congestion. That would be a mistake and conceptually wrong as the grid is a shared medium, shared by many different aggregators 21. Only the network operator 11 is in full control when it comes to avoiding network congestion. So even if aggregators 21 would do nothing with the congestion tag 18, the system will still work.

So far the interface 30 between device 40, aggregator 21 and DSO 21 and voltage control was discussed. But the utilization of the congestion-management system 10 can be extended towards transmission system operators (TSO) and the issue of frequency control.

Today mechanisms exist whereby all aggregators 21 should inform the TSO day-ahead about the power they will inject or retrieve from the TSO network (60) and at which points in the TSO grid. Based on that information the TSO will check if congestion occurs or not and if congestion would occur the TSO will re-allocate allowed power consumption or insertion between aggregators 21. In order for the TSO to check for grid constraints, the TSO needs to know where each aggregator 21 will insert or retrieve electricity on the TSO grid 60, a so-called Network Access Point (NAP) 70, as shown in FIG. 7. Today the power plants are directly coupled with the TSO grid 60 so it is easy to know the NAP 70. But when the power plant is in fact a "virtual power plant" with 100.000 prosumers spread over the country this is much more difficult.

Therefore it is proposed that in addition to the congestion tag 18 described before, the communication between devices 40 and the aggregator 21 is also tagged with a so-called "Network Access Point-tag" 19. As shown in FIG. 7, a network access point (NAP) tag 19 could be transmitted in addition to the congestion tag 18 from the congestion management (grid matcher) agent 13 to aggregator 21 via the standardized device control interface 30.

The NAP 19 is the point where the DSO grid 50 interconnects with the TSO grid 60, as illustrated in FIG. 7. Of course the DSO grid 50 connects to the TSO grid 60 on multiple points 70. Therefore the idea is that the DSO 11 populates in all smart meters 12 that are behind a particular NAP 19 the value of that NAP 19. When smart meters 12 subsequently insert this tag 19 into the communication between device 40 and aggregator 21 the aggregator 21 is able to inform the TSO where he will insert or extract power on the TSO grid 60. In this way the existing system for TSO congestion management can be re-used even if the production facilities are distributed and connected to the DSO network 50. Negotiations will take place between aggregators 21 and the TSO to find a global equilibrium between production and demand in more real-time than currently possible.

While above was described how the DSO-to-aggregator interface allows the aggregator 21 to inform the TSO about the amount of power that will be inserted at any particular NAP 70 to the TSO network 60, it will now be described, how the TSO can perform congestion management in accordance with embodiments of the present invention. In other words, how to run a real-time E-market where the E-market balance between production and demand always respects the grid limitations of the TSO network 60 as well.

A TSO congestion management system need not be or is not part of the DSO congestion management system 10. These can be separate systems.

In fact there are many different ways in which the TSO can perform congestion management in accordance with embodiments of the present invention. One way to perform congestion management on the TSO network 60 is described to demonstrate that it is compatible with the present invention but this is not limiting on the invention.

The TSO could use a dual-decomposition technique with an "energy price" and a "grid price" as parameters. The energy price is based on supply and demand between the producers and retailers on the energy market. The "TSO grid price" is imposed by the TSO. The TSO grid price is not necessarily one value—it could be specific to the NAP 70. For example, if too much power would be inserted on a particular NAP 70 the TSO will raise the TSO grid price for inserting electricity on that NAP and the aggregators 21 would reduce their offer to insert electricity at that NAP until equilibrium is found. That is the principle of dual decomposition that can make the existing TSO congestion management system more real time and find the best possible market equilibrium taking the TSO grid constraints into account.

Aggregators will be able to deal with NAP-specific grid prices as embodiments of the present invention provides them the information about the NAP identities that apply for their portfolio of customers.

The same principle can be applied for inter-TSO communication: when a TSO wants to insert power into another TSO he will need to make a bid on the market of that TSO for the NAP where the networks of both TSO's are physically connected.

In this way embodiments of the present invention allow aggregators to perform demand-side-management while enabling DSO's and TSO's to perform congestion management and avoid that actions from the aggregators and/or retailers would surpass the physical limitations of the distribution grid or the transmission grid.

An advantage of embodiments of the present invention is that the invention does not rely on passing grid topology and grid congestion information to the aggregators and as such it also does not rely on the good governance of aggregators to respect the physical limitations of the grid.

One of the most prominent standards for demand response is the Open ADR set of standards that have been worked out by the Open ADR Alliance, starting in the US but gradually being adopted by other regions throughout the world. Open ADR does not impose an architecture. Open ADR is a set of standards describing the communication between a "Virtual Top Node" and a "Virtual End Node". The Virtual Top Node could be a server owned by the utility and the Virtual End Node could be an individual device. But that is already an architectural choice (often used as example in Open ADR documents) and not imposed by the Open ADR standards.

The above described architecture in accordance with embodiments of the present invention can make use of the Open ADR standards.

In the architecture described above, the existing Open ADR standards could apply to the interface between the device 40 and the DSO 11 as well as to the interface 30 between the DSO 11 and the aggregator 21. All aspects of authentication, registration, security, etc. that have been worked out by the Open ADR standards would apply to these interfaces. Possibly only a few extensions of the Open ADR, such as the ability to insert tags like the congestion tag 18 and the Network Access Point tag 19.

So far we mainly discussed consumption of electricity but this proposed congestion-management system 10 will also allow distribution grid operators to curtail, for example, the power production of photovoltaic panels or combined heat and power (CHP) systems when needed.

In that case the congestion management (grid matcher) agent 13 will instruct the photovoltaic system to curtail. The normal communication between the photovoltaic system and the demand-side-management (e.g. power matcher) agent 13 will inform the aggregator 21 that the production has been reduced. Such a mechanism allows fairness to be introduced when curtailing photovoltaic systems on a particular segment and does not rely on the goodwill of aggregators 21 to do so.

In the end it is all about controlling the flexibility of devices 40 connected to the grid 50. By utilizing the congestion-management system 10 in accordance with embodiments of the present invention in conjunction with a prior art demand-side-management system 20, both the aggregator 21 and the distribution system operator (DSO) 11 are in control. With the congestion-management system 10 in accordance with embodiments of the present invention this can be achieved in a natural way with a gradual transition between the level of control by the aggregator 21 and the level of control by the DSO 11, as illustrated in FIG. 6.

The default situation is that the aggregators 21 control the flexibility by means of demand-side-management (e.g. power matcher) like systems 20. But as the network (50) becomes congested a congestion management (grid matcher) like system 20 will overrule the decisions of the aggregators 21 until a point where a congestion management (grid matcher) like system 10 is in full control. The level to which flexibility is controlled by aggregators 21 versus the level to which flexibility is controlled by grid network operators 11 will be a gradual curve that depends on the congestion level of the DSO network (50).

Moreover the interworking between a device 40, the congestion management system 10 of the DSO 11 and the demand-side-management system 20 of the aggregator 21 also enable the aggregator 21 to interwork with the congestion management system of the TSO network 60.

Instead of interfacing with individual devices 40, the smart meter 12 could also interface with a domotics system that controls the devices 40. In that case only the domotics system should support the standard interface 30 and not the individual devices 40. That could be an interesting option for use of existing devices 40 that do have a domotics interface but do not have the standard smart meter interface. The domotics supplier then simply needs to provide customers with an upgrade of the domotics systems supporting the standard smart meter interface.

A domotics system could also be interesting if the aggregator 21 should control individual devices 40 and their flexibility. For example, the flexibility of devices 40 could be coupled; there could be a hierarchy of devices 40 to be switched off or on. So domotics will continue to play a role and can provide added value compared to the direct control of individual devices 40. The only requirement is that the domotics system then supports the standard interface 30 towards the smart meter 12. Domotics should be seen in the broadest sense here, such as, but not limited to, an in-home automation system, an entire office building energy management system, an industrial control system.

A congestion management (grid matcher) system 10 or a congestion-management system in accordance with embodiments of the present invention and any known power matcher system 20 or a typical prior art demand-side-management system can be implemented as computer based systems, e.g. making use of dedicated software adapted to run on a processing engine such as a microprocessor or FPGA. The present invention in embodiments provides a computer program in a computer readable format, comprising the software components as disclosed in the description above and below.

Accordingly, embodiments of the present invention can provide software, e.g. in the form of a computer program, which when executed on a processing engine such as a microprocessor or FPGA assists in the management of a combination of a congestion management (grid matcher) system 10 or a congestion-management system in accordance with embodiments of the present invention and any known power matcher system 20 or a typical prior art demand-side-management system.

The congestion management (grid matcher) system 10 can comprise a smart meter 12 having a processing engine such as a microprocessor or FPGA, and a plurality of grid matcher agents 13, of which one has been illustrated. The agents can be implemented in software for execution on the processing engine such as a microprocessor or FPGA.

The demand-side-management system (e.g. power matcher system) 20 can comprise an energy gateway 22 having a processing engine such as a microprocessor or FPGA, and a plurality of demand-side-management (e.g. power matcher) agents 23, of which one has been illustrated. The agents 23 may be implemented in software and can be executed on the processing engine such as a microprocessor or FPGA.

A standardized device control interface 30 connects the energy gateway 22 over the smart meter 12 with a device 40. Software when executed on a processing engine such as a microprocessor or FPGA can enable communication between them. Accordingly, the device 40 can have a processing engine such as a microprocessor or FPGA and can comprise device control software 41. Software can be adapted to provide a standardized device control interface 30 that can carry a signal 31 for delivering power to device 40 initiated by the aggregator 21 from the energy gateway 22 to the device 40 via the smart meter 12.

Software can be adapted to enable interception of the communication between the energy gateway 22 to the device 40 by the distribution system operator (DSO) 11, and specifically between the demand-side-management (e.g. power matcher) agent 23 and the device control software 41. The interception point 32 is located on the standardized device control interface 30. The interception point should be as close as possible to the device 40 to allow the system to scale.

Software can be adapted to enable the distribution system operator (DSO) 11 to prevent that any electricity production and/or consumption is invoked that would surpass the capabilities of the DSO network 50.

Software of the congestion management (grid matcher) agent 13 can be adapted to compile a priority level 14 for the device 40. Software of the demand-side-management (e.g. power matcher) agent 23 can compile the demand-side-management (e.g. power matcher) device priority value 24. This congestion management (grid matcher) device priority value 14 is not required to be the same as the demand-side-management (e.g. power matcher) device priority value 24 compiled by the demand-side-management (e.g. power matcher) agent 23.

When the device priority 40 is higher than the price index 25 as illustrated in FIG. 3.*a*, the software of the demand-side-management (e.g. Power Matcher) agent 23 can be adapted to send a command to device 40 to start consuming. Software of the demand-side-management (e.g. Power Matcher) agent 23 can be adapted send a command to the device 40 to stop consuming when the device priority 40 is lower than the price index 25.

Software can be adapted to calculate the priority value (14 or 24) of a device 40 based on the status of the device 40 as described above.

The software of each congestion management (grid matcher) agent 13 can be adapted to compile and maintain a congestion index 15 for each endpoint of the network as described above. The present invention includes within its scope a variety of means to calculate the congestion index 15, for example, based on the local voltage deviation as described above like in the concept of local droop control. The congestion index for consumption can be different from the congestion index for production.

Software can be adapted so that if the voltage is lower than normal consumption is discouraged, therefore the value of the congestion index 15 for consumption will increase as the voltage gets lower. Software can be adapted to that when the voltage reaches a minimum boundary value the value of the congestion index becomes very high such that all additional requests for consumption will be overruled.

Software can be adapted so that if the voltage is higher than normal additional production is discouraged, therefore the value of the congestion index 15 for production will increase as the voltage gets higher. When the voltage reaches a maximum boundary value the value of the congestion index will become very high such that all additional requests for production will be overruled.

Alternatively the software can be adapted so that the congestion index 15 is based on a calculation done in the network, as schematically described above with respect to FIGS. 5*a* and 5*b*. Software can be adapted to perform a calculation of the congestion index 15 based on the priority values 14 of the various connected devices 40 as well as the current and expected congestion level of the network 17.

The software of each smart meter 12 can be adapted to forward the device priority information 14 as well as any network parameter information 17 to a network server, a congestion management (grid matcher) prioritizer 16. Software in the congestion management (grid matcher) prioritizers 16 can be adapted to calculate an appropriate congestion index 15 for every of the end-points such that—given the values of the device priorities 14—the congestion index 15 is high enough to prevent overall congestion in the network.

Software in the congestion management (grid matcher) prioritizer 16 can be adapted to send back this congestion index 15 to every of the smart meters 12 and, thus, to each of the congestion management (grid matcher) agents 13. Software can be adapted to update the congestion index 15 whenever relevant changes happen or are expected to happen on the network, for example, based on actual load on the network as well as the typical knowledge base like requests to consume or produce, weather forecasts, historical data on consumption/production, etc.

Irrespective of how the congestion index 15 is calculated, the combination of congestion management (grid matcher) device priority value 14 and congestion index 15 allows software of the DSO 11 to overrule the instructions from the aggregator 21 in case of congestion and allows the DSO 11 to do this in an intelligent way: in case of congestion, priority should still be given to those devices 40 that are most urgent to charge.

Software can be adapted so that the congestion management (grid matcher) device priority value 14 and the congestion index 15 are used as follows to achieve this:

when the congestion management (grid matcher) device priority value 14 is higher than the congestion index 15, the signal 31 that comes from the aggregator 21 is not disturbed when the congestion management (grid matcher) device priority value 14 is lower than the congestion index 15, the signal 31 that comes from the aggregator 21 will be interrupted by the DSO 11. So in case the congestion is low, the sequence will look like as illustrated in FIG. 1.

When the congestion index 15 becomes higher than the congestion management (grid matcher) priority value 14 of the device 40, software of the congestion management (grid matcher) system 10 can be adapted to overrule the signal from the demand-side-management (e.g. power matcher) agent 23 and transform, for example block a command to start the device 40. The congestion management (grid matcher) system 10 will further respond to the demand-side-management (e.g. power matcher) agent 23 that the device 40 did not start.

Software can be adapted so the smart meter 12 can do more than simply overrule commands of the aggregator 21. Software of the smart meter 12 can also be adapted to take the initiative to start or stop certain devices 40 if the congestion index 15 would become too high.

In order to avoid that the aggregator 21 is "taken by surprise" when the grid operator 11 overrules a number of the aggregator decisions, software of the congestion management (grid matcher) agent 13 can "tag" the information sent to the demand-side-management (e.g. power matcher) agent 23 with a congestion tag 18. Software of an aggregator 21 can be adapted to take this additional piece of information into account when deciding to switch on a device 40 or not. Software can be adapted such that the congestion tag 18 is interpreted by the aggregator 21 as a probability that its command to consume or produce can be overruled. Software of the aggregator 21 can be adapted to take this additionally provided information into account to make more reliable predictions about the flexibility that will be able to be invoked effectively.

So far the interface 30 between device 40, aggregator 21 and DSO 21 and voltage control was discussed. But the utilization of the congestion-management system 10 can be extended towards transmission system operators (TSO) and the issue of frequency control.

In addition to the congestion tag 18 described before, software can be adapted to provide communication between devices 40 and the aggregator 21 with a so-called "Network Access Point-tag" 19. Software can be adapted so that a network access point (NAP) tag 19 can be transmitted in addition to the congestion tag 18 from the congestion management (grid matcher) agent 13 to aggregator 21 via the standardized device control interface 30.

Software can be adapted so that the DSO 11 populates in all smart meters 12 that are behind a particular NAP 19 the value of that NAP 19. When software of the smart meters 12 is adapted to subsequently insert this tag 19 into the communication between device 40 and aggregator 21, software of the aggregator 21 is able to inform the TSO where it will insert or extract power on the TSO grid 60.

In accordance with embodiments of the present invention, software of a TSO uses a dual-decomposition technique with an "energy price" and a "grid price" as parameters. For example, if too much power would be inserted on a particular NAP 70 the software of the TSO can be adapted to raise the TSO grid price for inserting electricity on that NAP and the software of the aggregators 21 can be adapted to reduce any offer to insert electricity at that NAP until equilibrium is found. Software according to embodiments of the present invention can be adapted to implement the Open ADR set of standards.

Software implementing the existing Open ADR standards can be used at the interface between the device 40 and the DSO 11 as well as to the interface 30 between the DSO 11 and the aggregator 21. All aspects of authentication, registration, security, etc. that have been worked out by the Open ADR standards would apply to these interfaces. Possibly only a few extensions of the Open ADR, such as the ability to insert tags like the congestion tag 18 and the Network Access Point tag 19. With respect to the power production of photovoltaic panels or combined heat and power (CHP) systems, software of the congestion management (grid matcher) agent 13 can be adapted to instruct the photovoltaic system to curtail. Software can be adapted so that normal communication between the photovoltaic system and the demand-side-management (e.g. power matcher) agent 13 will inform the aggregator 21 that the production has been reduced.

In accordance with further embodiments of the present invention, Instead of interfacing with individual devices 40, software of the smart meter 12 can be adapted to interface with a domotics system that controls the devices 40.

Any of the software mentioned above can be stored on a non-transitory signal storage medium such as an optical disk (CD- or DVD-ROM), magnetic tape, magnetic disk or solid state memory such as a flash memory or any other similar digital memory device.

Figure 8:
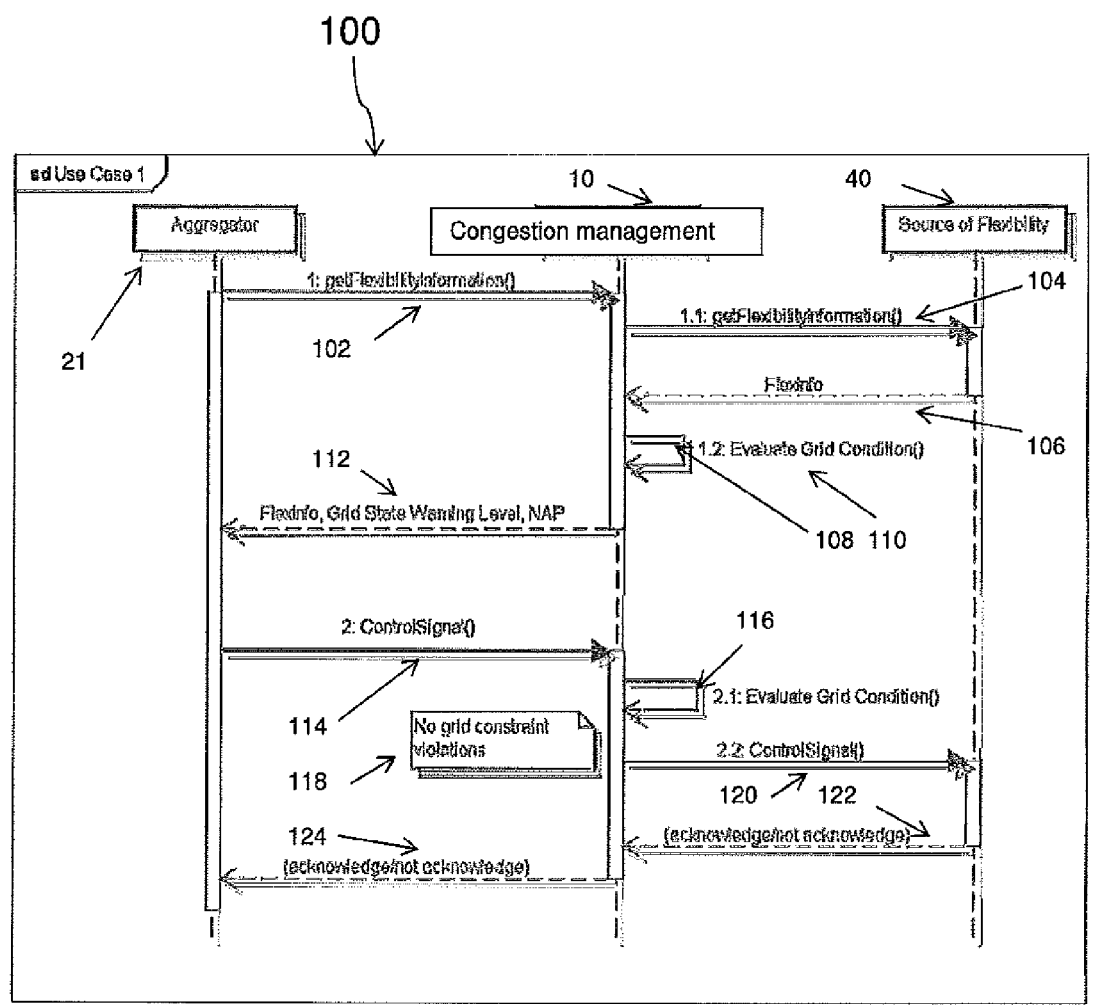
FIG. 8 to FIG. 11 show flow diagrams for messaging in accordance with embodiments of the present invention.

A flow diagram 100 of how aggregator signals pass unchanged in a non-grid constrained situation is shown in FIG. 8.

In step 102 aggregator requests flexibility info from a device abstraction interface, implemented by a congestion management system according to embodiments of the present invention.

In step 104 the congestion management system according to embodiments of the present invention requests flexibility information from the device abstraction interface, e.g. implemented by the source of the flexibility.

In step 106 such flexibility information is provided.

In step 108 the congestion management system according to embodiments of the present invention gets grid information from (local) grid measurements. The congestion management system according to embodiments of the present invention identifies grid constraints if any, and composes a warning level if required.

In step 110 the congestion management system according to embodiments of the present invention tags information sent by the device abstraction interface to aggregator with both grid state warning level and localization information such as network access point, NAP.

In step 112, the flexibility, warning and grid information is passed to the aggregator.

In step 114 the aggregator issues a Demand Response (DR) control signal to the device abstraction interface, implemented by the congestion management system according to embodiments of the present invention.

The congestion management system according to embodiments of the present invention evaluates the effect of the DR control signal on the grid condition in step 116.

When the congestion management system according to embodiments of the present invention evaluates in step 118 that the grid constraint information does not indicate a violation of grid constraints, the congestion management system according to embodiments of the present invention passes the aggregator signals in step 120 to the source of the flexibility without intervening.

The sources of flexibility return an acknowledgement in step 122 and 124 although the acknowledgement could be given implicitly.

Figure 9:
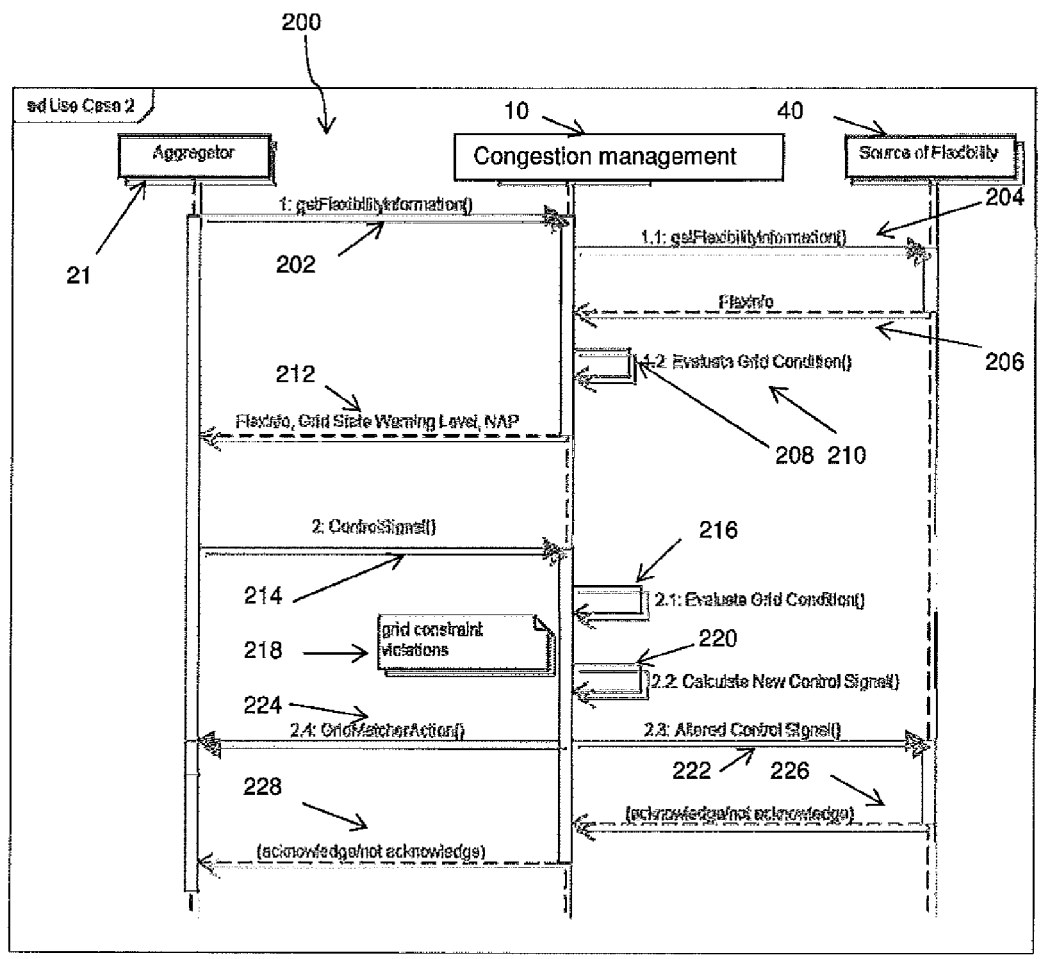

A flow diagram 200 of how an intervention is made in aggregator control signals in a grid constrained situation is shown in FIG. 9.

In step 202, an aggregator requests flexibility information from the device abstraction interface, implemented by a congestion management system according to embodiments of the present invention.

In step 204 the congestion management system according to embodiments of the present invention requests flexibility information from the device abstraction interface, implemented by the source of the flexibility.

In step 206 such flexibility information is provided.

In step 208 the congestion management system according to embodiments of the present invention gets grid information from (local) grid measurements. The congestion management system according to embodiments of the present invention identifies grid constraints if any, and composes a warning level if required.

In step 210 the congestion management system according to embodiments of the present invention tags information sent by the device abstraction interface to aggregator with both grid state warning level and localization information such as a network access point, NAP.

In step 212 the flexibility information and the grid information is passed to the aggregator.

In step 214 the aggregator issues a DR control signal to the device abstraction interface, implemented by the congestion management system according to embodiments of the present invention.

In step 216 the grid condition is evaluated by the congestion management system according to embodiments of the present invention.

In step 218 grid constraint violations are evaluated and if they will occur when the requested flexibility is activated, the congestion management system according to embodiments of the present invention blocks or changes the aggregator control signal in step 220.

In step 222 the congestion management system according to embodiments of the present invention transmits the altered control signal to the device abstraction interface.

In step 224 the congestion management system according to embodiments of the present invention informs the aggregator of the action that was performed, In steps 226, 228 the sources of flexibility return an acknowledgement although the acknowledgement could be given implicitly.

Figure 10:
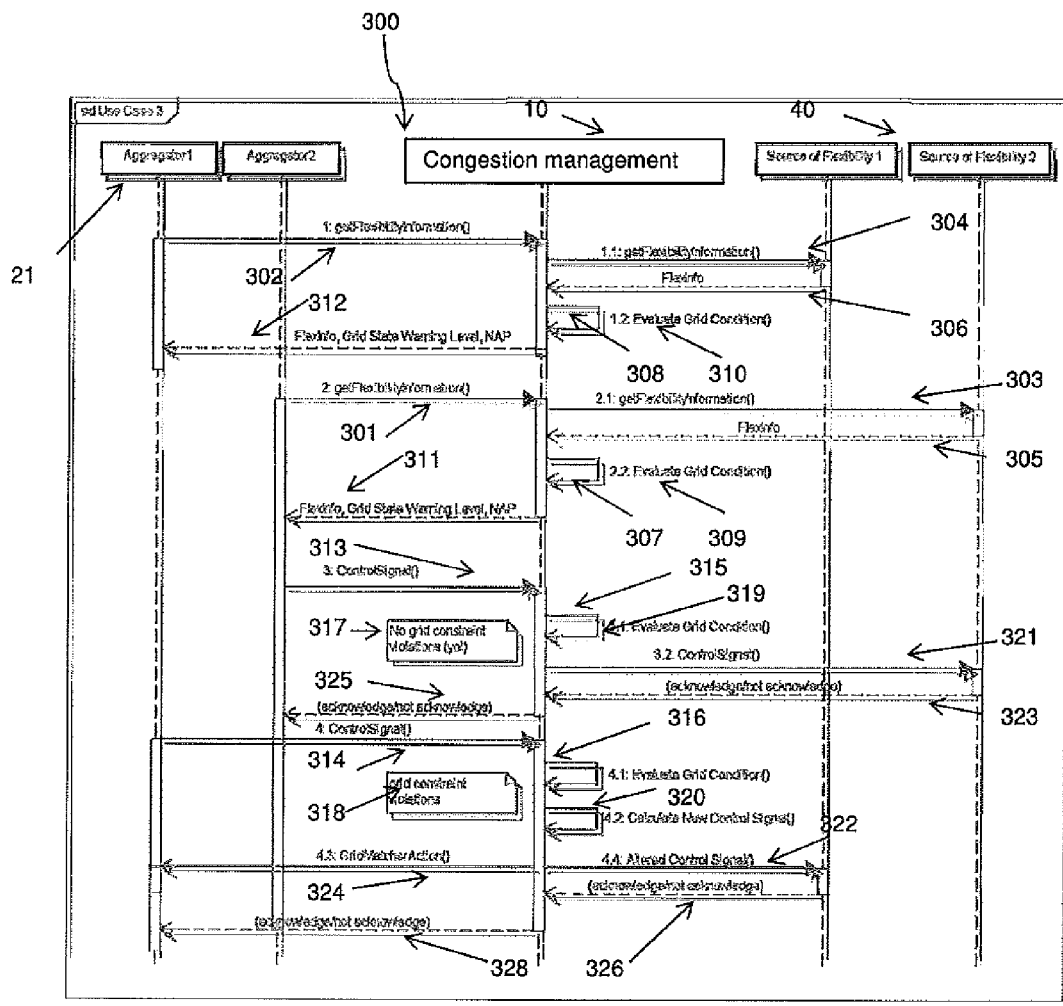

A flow diagram 300 in FIG. 10 shows how activating a flexible device causes congestion, while other flexible devices are already activated. In one aspect the congestion management system according to embodiments of the present invention can function on a first come, first serve basis.

When a control action of a flexible device causes constraint violations, the control action is altered, even if other flexible devices have already been activated on the same grid.

In step 302 a first aggregator requests flexibility information from a first device abstraction interface, implemented by the congestion management system according to embodiments of the present invention.

In step 304 the congestion management system according to embodiments of the present invention requests flexibility information from the first device abstraction interface, implemented by the source of the flexibility.

In step 306 such flexibility information is provided.

In step 308 the congestion management system according to embodiments of the present invention gets grid information from (local) grid measurements. The congestion management system according to embodiments of the present invention identifies grid constraints if any, and composes a warning level if required.

In step 310 the congestion management system according to embodiments of the present invention tags information sent by the device abstraction interface to aggregator with both grid state warning level and localization information such as a network access point, NAP.

In step 312 the flexibility information and the grid information is passed to the aggregator.

In step 301 a second aggregator requests flexibility information from a second device abstraction interface, implemented by the congestion management system according to embodiments of the present invention.

In step 303 the congestion management system according to embodiments of the present invention requests flexibility information from the first device abstraction interface, implemented by the source of the flexibility.

In step 305 such flexibility information is provided.

In step 307 the congestion management system according to embodiments of the present invention gets grid information from (local) grid measurements. The congestion management system according to embodiments of the present invention identifies grid constraints if any, and composes a warning level if required.

In step 309 the congestion management system according to embodiments of the present invention tags information sent by the second device abstraction interface to aggregator with both grid state warning level and localization information such as a network access point, NAP.

In step 311 the flexibility information and the grid information is passed to the aggregator.

In step 313 the aggregator issues a DR control signal to the second device abstraction interface, implemented by the congestion management system according to embodiments of the present invention.

In step 315 the grid condition is evaluated by the congestion management system according to embodiments of the present invention.

In step 317 grid constraint violations are evaluated and if they will occur when the requested flexibility is activated, the congestion management system according to embodiments of the present invention blocks or changes the aggregator control signal in step 319.

In step 321 the congestion management system according to embodiments of the present invention transmits the altered control signal to the second device abstraction interface.

Optionally the congestion management system according to embodiments of the present invention informs the aggregator of the action that was performed.

In steps 323, 325 the sources of flexibility return an acknowledgement although the acknowledgement could be given implicitly.

In step 314 the aggregator issues a DR control signal to the first device abstraction interface, implemented by the congestion management system according to embodiments of the present invention.

In step 316 the grid condition is evaluated by the congestion management system according to embodiments of the present invention.

In step 318 grid constraint violations are evaluated and if they will occur when the requested flexibility is activated, the congestion management system according to embodiments of the present invention blocks or changes the aggregator control signal in step 320.

In step 322 the congestion management system according to embodiments of the present invention transmits the altered control signal to the first device abstraction interface.

In step 324 the congestion management system according to embodiments of the present invention informs the aggregator of the action that was performed.

In steps 326, 328 the sources of flexibility return an acknowledgement although the acknowledgement could be given implicitly.

Figure 11:
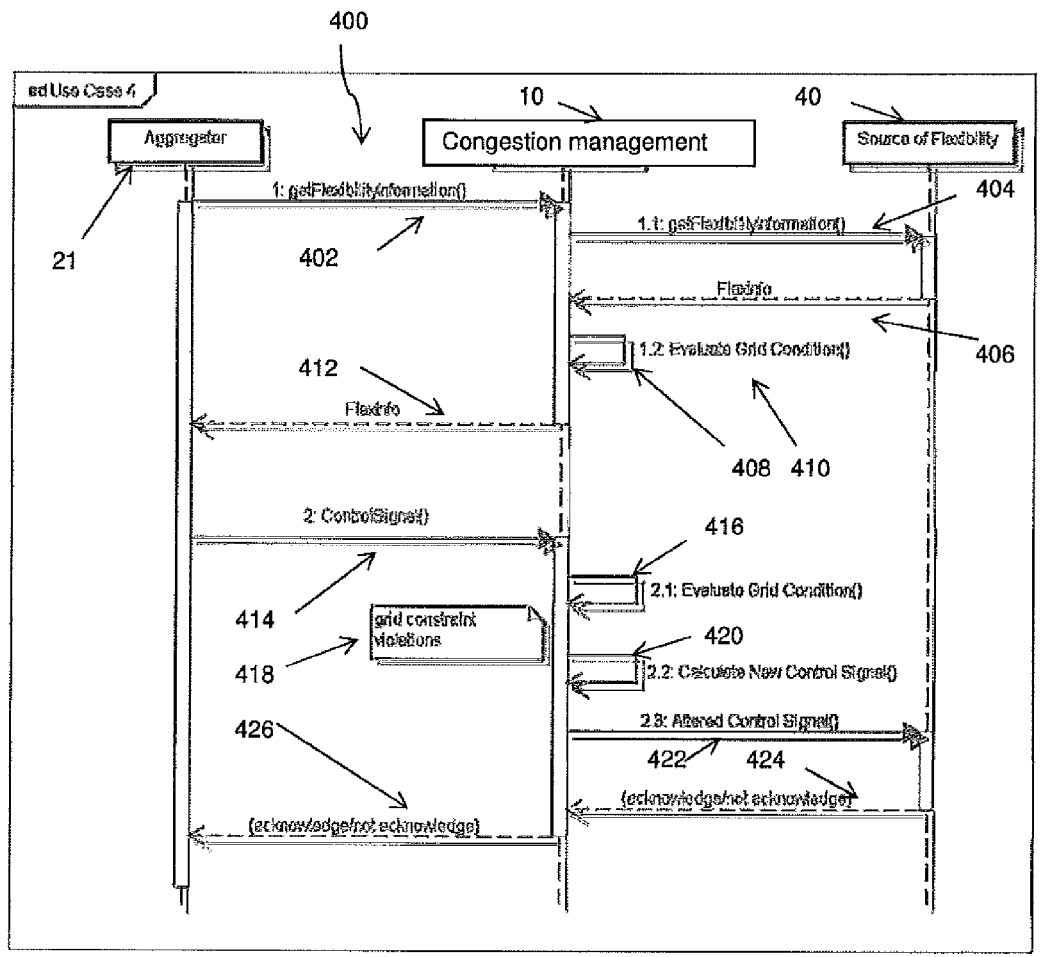

A flow diagram 400 in FIG. 11 shows how an aggregator controls a flexible source with a congestion management system according to embodiments of the present invention, but does not support the interface of the congestion management system according to embodiments of the present invention for grid and other information. Not all aggregators need to support the interface of the congestion management system according to embodiments of the present invention with respect to information on the grid state, and actions of the congestion management system according to embodiments of the present invention.

In step 402 aggregator requests flexibility information from a device with flexibility.

In step 404 the congestion management system according to embodiments of the present invention requests flexibility information from the device abstraction interface, e.g. implemented by the source of the flexibility.

In step 406 such flexibility information is provided.

In step 408 the congestion management system according to embodiments of the present invention gets grid information from (local) grid measurements. The congestion management system according to embodiments of the present invention identifies grid constraints if any, and composes a warning level if required.

In step 410 the congestion management system according to embodiments of the present invention collects flexibility information for the aggregator.

In step 412, the flexibility information is passed to the aggregator.

In step 414 the aggregator issues a DR control signal.

The congestion management system according to embodiments of the present invention evaluates the effect of the DR control signal on the grid condition in step 416.

When the congestion management system according to embodiments of the present invention evaluates in step 418 that the grid constraint information does indicate a violation of grid constraints, the congestion management system according to embodiments of the present invention alters the control signal in step 420.

In step 422 the congestion management system according to embodiments of the present invention passes the altered aggregator control signals in to the source of the flexibility.

The sources of flexibility return an acknowledgement in step 424 and 426 although the acknowledgement could be given implicitly There are different options for a congestion management system according to embodiments of the present invention on how to handle the information stream from and to the aggregators and flexibility sources. To provide an overview on choices made, pros and cons of the different options are listed below:

| Flexibility Information | Aggregator Control Signals | |
| --- | --- | --- |
| Pass on transparently | Pass on transparently | Case without congestion management in accordance with embodiments of the present invention |
| Pass on transparently | Adapt current control signal according to grid state | PRO:<br>Aggregators are always aware of the actual status of their flexibility sources.<br>the congestion management system according to embodiments of the present invention can take action when requested control signals threaten to violate grid constraints.<br>Information on how the control signals are adapted may additionally be communicated to aggregators.<br>CON:<br>Only allowing immediate action on aggregator control signals might result in the fact that the distribution of the contribution to constraint violation mitigation of different flexibility sources is not optimal.<br>Constraint violations occurring without the presence of aggregator control signals cannot be mitigated.<br>The flexibility source may not react as the aggregator expected. |

-continued

| Flexibility Information | Aggregator Control Signals | |
|---|---|---|
| Pass on transparently | Adapt current control signal according to grid state + independently from aggregator send new control signals to flex sources according to grid state. | PRO:<br>Aggregators are always aware of the actual status of their flexibility sources.<br>the congestion management system according to embodiments of the present invention can take action when requested control signals threaten to violate grid constrains.<br>the congestion management system according to embodiments of the present invention can also take action without the presence of aggregator control signals when grid constraints are violated.<br>Allowing the adaptation of control signals as well as adding new signals can make sure that the distribution of the contribution of flexibility sources to constraint violation mitigation can be done in a (more) optimal way.<br>Information on how the control signals are adapted may additionally be communicated to aggregators.<br>CON:<br>When the congestion management system according to embodiments of the present invention activates flexibility sources on its own initiative, possibly contracted flexibility is consumed, and flexibility is removed from the flexibility market in a possibly non-transparent way.<br>The flexibility source may not react as the aggregator expected. |
| Adapt according to grid state | Pass on transparently | PRO:<br>Aggregators do not need to adapt any of their interfaces, flexibility information can always be used as communicated.<br>Information on how the flexibility information is adapted may additionally be communicated to aggregators.<br>CON:<br>Flexibility information is adapted on a 'would be hazardous' basis, not on an actual control signal basis. The risk exists that too much flexibility is pinched off to avoid grid constraint violations; flexibility is removed from the flexibility market in a possibly non-transparent way. |
| Adapt according to grid state | Adapt current control signal according to grid state | PRO:<br>Aggregators do not need to adapt any of their interfaces, flexibility information can always be used as communicated.<br>Information on how the flexibility information and the control signals are adapted may additionally be communicated to aggregators.<br>CON:<br>Flexibility information is adapted on a 'would be hazardous' basis, not on an actual control signal basis. The risk exists that too much flexibility is pinched off to avoid grid constraint violations.<br>The adaptation of control signals as well as flexibility information by the congestion management system according to embodiments of the present invention makes the congestion management system according to embodiments of the present invention a powerful controller, but the risk of non-transparency increases, |
| Adapt according to grid state | Adapt current control signal according to grid state + independently from aggregator send new control signals to flex sources according to grid state. | PRO:<br>Aggregators do not need to adapt any of its interfaces, flexibility information can always be used as communicated.<br>Information on how the flexibility information and the control signals are adapted may additionally be communicated to aggregators.<br>CON:<br>Flexibility information is adapted on a 'would be hazardous' basis, not on an actual control signal basis. The risk exists that too much flexibility is pinched off to avoid grid constraint violations.<br>The adaptation of control signals as well as flexibility information by the congestion management system according to embodiments of the present |

| Flexibility Information | Aggregator Control Signals |
|---|---|
| | invention makes the congestion management system according to embodiments of the present invention powerful, and the risk of non-transparency increases. When the congestion management system according to embodiments of the present invention activates flexibility sources on its own initiative, possibly contracted flexibility is consumed, and flexibility is removed from the flexibility market in a possibly non-transparent way. |

Embodiments of the invention may be formalized as

Clause 1. Embodiments of the present invention provide a method for adjusting or matching electricity demand with electricity production while taking the physical limitations of the electricity grid into account, comprising the steps of:
providing a congestion management (grid matcher) system (10) that enables a electricity grid operator (11) to stay in control of the electricity grid (50);
placing the congestion management (grid matcher) system (10) into communication between a demand-side-management system (e.g. power matcher system) (20) used by an aggregator (21) and a device (40) via a standardized device control interface (30); and
enabling the electricity grid operator (11) to intercept the communication between the demand-side-management system (e.g. power matcher system) (20) and the device (40) at an interception point (32) located on the standardized device control interface (30) by utilizing the congestion management (grid matcher) system (10).

Clause 2. The method according to clause 1, wherein the grid operator (11) is a distribution system operator.

Clause 3. The method according to clause 1 or 2, further comprising the steps of:
providing a congestion management (grid matcher) agent (13) within the congestion management (grid matcher) system (10); and compiling information about the priority of the device (40) by calculating a grid matcher device priority value (14) with the congestion management (grid matcher) agent (13).

Clause 4. The method according to clause 3, further comprising the step of:
compiling and maintaining a congestion index (15) that gives an indication of the grid congestion at any given moment in time with the congestion management (grid matcher) agent (13).

Clause 5. The method according to any of clauses 1 to 4, further comprising the steps of:
providing a smart meter (12) within the (grid matcher) system (10); and
applying the concept of local droop control to determine the value of the congestion index (15) based on the voltage at the smart meter (12).

Clause 6. The method according to any of clauses 1 to 5, further comprising the steps of:
providing a (congestion management) grid matcher prioritizer (16) within the congestion management (grid matcher) system (10);
providing the grid matcher prioritizer (16) with the congestion management (grid matcher) device priority value (14) and grid parameter information; and
calculating the congestion index (15) with the grid matcher prioritizer (16).

Clause 7. The method according to any of clauses 1 to 6, further comprising the step of:
populating the congestion management (grid matcher) device priority value (14) and the congestion index (15) in the smart meter.

Clause 8. The method according to any of clauses 1 to 7, further comprising the step of:
leaving the communication between aggregator (21) and device (40) undisturbed when the congestion index (15) is lower than the congestion management (grid matcher) device priority value (14).

Clause 9. The method according to any of clauses 1 to 8, further comprising the step of:
blocking, interrupting, or changing the communication between the aggregator (21) and device (40) when the congestion index (15) is higher than the (congestion management) grid matcher device priority value (14).

Clause 10. The method according to any of clauses 1 to 9, further comprising the step of:
inserting a congestion tag (18) into the communication between the aggregator (21) and device (40) thereby enabling the aggregator (21) to use the congestion tag (18) as a level of probability that a command to the device initiated by the aggregator (21) could be interrupted by the grid operator (11).

Clause 11. The method according to any of the clauses 1 to 10 wherein the method is a computer based method.

Clause 12. The method according to any of the clauses 1 to 11, further comprising the steps of:
maintaining a network access point tag (19) for each network access point (70);
inserting the network access point tag (19) into the communication between the aggregator (21) and the device (40); and
using the network access point tag (19) for the communication between the aggregator (21) and the transmission system operator.

Clause 13. The method according to clause 12, further comprising the step of:
using the network access point tag (19) to inform the transmission system operator where the aggregator (21) will insert or retrieve electricity on the transmission system operator grid (60).

Clause 14. The method according to any of clauses 4 to 13, wherein the congestion index for consumption is different from the congestion index for production.

Clause 15. A congestion management system for interconnecting power transmission and distribution networks, the system comprising grid matcher system (10), a congestion management (grid matcher agent) (13), and a smart meter (12) for performing the method steps of any of clauses 1 to 14.

Clause 16. A system for adjusting or matching electricity demand with electricity production while taking the physical limitations of the electricity grid into account, comprising:

Means for providing a grid matcher system (10) that enables an electricity grid operator (11) to stay in control of the electricity grid (50);

Means for placing the congestion management (grid matcher) system (10) into communication between a demand-side-management system (e.g. power matcher system) (20) used by an aggregator (21) and a device (40) via a standardized device control interface (30); and Means for enabling the electricity grid operator (11) to intercept the communication between the demand-side-management system (e.g. power matcher system) (20) and the device (40) at an interception point (32) located on the standardized device control interface (30) by utilizing the congestion management (grid matcher) system (10).

Clause 17. The system according to clause 16, wherein the grid operator (11) is a distribution system operator.

Clause 18. The system according to clause 16 or 17, further comprising:

Means for providing a congestion management (grid matcher agent) (13) within the congestion management (grid matcher) system (10); and means for compiling information about the priority of the device (40) by calculating a congestion management (grid matcher) device priority value (14) with the congestion management (grid matcher) agent (13).

Clause 19 The system according to clause 18, further comprising:

Means for compiling and maintaining a congestion index (15) that gives an indication of the grid congestion at any given moment in time with the congestion management (grid matcher) agent (13).

Clause 20 The system according to any of clauses 16 to 19, further comprising:

Means for providing a smart meter (12) within the congestion management (grid matcher) system (10); and Means applying the concept of local droop control to determine the value of the congestion index (15) based on the voltage at the smart meter (12).

Clause 21. The system according to any of clauses 16 to 20, further comprising:

Means for providing a congestion management (grid matcher) prioritizer (16) within the congestion management (grid matcher) system (10);

Means for providing the congestion management (grid matcher) prioritizer (16) with the congestion management (grid matcher) device priority value (14) and grid parameter information; and Means for calculating the congestion index (15) with the congestion management (grid matcher) prioritizer (16).

Clause 22. The system according to any of clauses 16 to 21, further comprising:

Means for populating the grid matcher device priority value (14) and the congestion index (15) in the smart meter, Clause 23. The system according to any of clauses 16 to 22, further comprising:

Means for leaving the communication between aggregator (21) and device (40) undisturbed when the congestion index (15) is lower than the grid matcher device priority value (14).

Clause 24. The system according to any of clauses 16 to 23, further comprising:

Means for blocking, interrupting, or changing the communication between the aggregator (21) and device (40) when the congestion index (15) is higher than the grid matcher device priority value (14).

Clause 25. The system according to any of clauses 16 to 24, further comprising:

Means for inserting a congestion tag (18) into the communication between the aggregator (21) and device (40) thereby enabling the aggregator (21) to use the congestion tag (18) as a level of probability that a command to the device initiated by the aggregator (21) could be interrupted by the grid operator (11).

Clause 26. The system according to any of the clauses 16 to 25, further comprising:

Means for maintaining a network access point tag (19) for each network access point (70);

Means for inserting the network access point tag (19) into the communication between the aggregator (21) and the device (40); and Means for using the network access point tag (19) for the communication between the aggregator (21) and the transmission system operator.

Clause 27. The system according to clause 26, further comprising:

Means for using the network access point tag (19) to inform the transmission system operator where the aggregator (21) will insert or retrieve electricity on the transmission system operator grid (60).

Clause 28. The system according to any of the clauses 19 to 27 wherein the congestion index for consumption is different from the congestion index for production.

Clause 29. A computer program in a computer readable format, comprising the software components for performing the method steps according to any of clauses 1 to 14.

Clause 30. A non-transitory storage medium storing the computer program product of clause 29.

Other arrangements for accomplishing the objectives of embodiments of the present invention will be obvious for those skilled in the art. It is to be understood that although preferred embodiments, specific constructions and configurations, as well as materials, have been discussed herein for devices according to the present invention, various changes or modifications in form and detail may be made without departing from the scope and spirit of this invention.

The invention claimed is:

1. A method for adjusting or matching electricity demand with electricity production while taking the physical limitations of the electricity grid into account, comprising the steps of:

providing a congestion management system that enables a electricity grid operator to stay in control of the electricity grid;

placing the congestion management system into communication between a demand-side-management system used by an aggregator and a device via a standardized device control interface, wherein the aggregator combines the loads and power requirements of more than one electricity account;

enabling the electricity grid operator to intercept the communication between the demand-side-management system used by the aggregator and the device at an interception point located on the standardized device control interface by utilizing the congestion management system to allow intervention in demand response control;

providing a congestion management agent within the congestion management system; and compiling information about the priority of the device by calculating a congestion management priority value with the congestion management agent.

2. The method according to claim 1, further comprising the step of:

compiling and maintaining a congestion index that gives an indication of the grid congestion at any given moment in time with the congestion management agent.

3. The method according to claim 1, further comprising the steps of:

providing a smart meter within the congestion management system; and applying the concept of local droop control to determine the value of a congestion index based on the voltage at the smart meter.

4. The method according to claim 1, further comprising the steps of:

providing a congestion management prioritizer within the congestion management system;

providing the congestion management prioritizer with the congestion management device priority value and grid parameter information; and calculating a congestion index with the congestion management prioritizer.

5. The method according to claim 1, further comprising the step of:

populating the congestion management device priority value and a congestion index in the smart meter.

6. The method according to claim 1, further comprising the step of:

leaving the communication between aggregator and device undisturbed when a congestion index is lower than the congestion management device priority value.

7. The method according claim 1, further comprising the step of:

blocking, interrupting, or changing the communication between the aggregator and device when a congestion index is higher than the congestion management device priority value.

8. The method according to claim 1, further comprising the step of:

inserting a congestion tag into the communication between the aggregator and device thereby enabling the aggregator to use the congestion tag as a level of probability that a command to the device initiated by the aggregator could be interrupted by the grid operator.

9. The method according to claim 1, further comprising the steps of:

maintaining a network access point tag for each network access point;

inserting the network access point tag into the communication between the aggregator and the device; and using the network access point tag for the communication between the aggregator and the transmission system operator.

10. The method according to claim 9, further comprising the step of:

using the network access point tag to inform the transmission system operator where the aggregator will insert or retrieve electricity on the transmission system operator grid.

11. The method according to claim 1, wherein a congestion index for consumption is different from a congestion index for production.

12. A non-transitory storage medium storing a computer program in a computer readable format, comprising software components for performing the method steps according to claim 1.

13. A system for adjusting or matching electricity demand with electricity production while taking the physical limitations of the electricity grid into account, comprising:

a congestion management system configured in a way so that a electricity grid operator is enabled to stay in control of the electricity grid;

a demand-side-management system used by an aggregator and a device, wherein the congestion management system is placed between the demand-side management system and the device via a standardized device control interface, wherein the aggregator combinines the loads and power requirements of more than one electricity account, wherein the electricity grid operator is enabled to intercept the communication between the demand-side-management system and the device at an interception point located on the standardized device control interface by utilizing the congestion management system to allow intervention in demand response control, and further comprising:

a congestion management agent within the congestion management system; the congestion management agent being adapted to compile information about the priority of the device by calculating a congestion management priority value.

14. The system according to claim 13, wherein the grid operator is a distribution system operator.

* * * * *